US012671532B2

(12) United States Patent
Wu

(10) Patent No.: US 12,671,532 B2
(45) Date of Patent: Jun. 30, 2026

(54) TRANSMISSION METHOD AND APPARATUS, COMMUNICATION DEVICE, AND COMPUTER STORAGE MEDIUM

(71) Applicant: VIVO MOBILE COMMUNICATION CO., LTD., Guangdong (CN)

(72) Inventor: Jianming Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 23 days.

(21) Appl. No.: 18/587,186

(22) Filed: Feb. 26, 2024

(65) Prior Publication Data

US 2024/0195548 A1 Jun. 13, 2024

Related U.S. Application Data

(63) Continuation of application No. PCT/CN2022/114165, filed on Aug. 23, 2022.

(30) Foreign Application Priority Data

Aug. 27, 2021 (CN) .......................... 202110997740.7

(51) Int. Cl.
| | |
|---|---|
| *H04L 5/00* | (2006.01) |
| *G01S 7/00* | (2006.01) |
| *H04B 7/0456* | (2017.01) |

(52) U.S. Cl.
CPC ............ *H04L 5/0023* (2013.01); *G01S 7/006* (2013.01); *H04B 7/0456* (2013.01)

(58) Field of Classification Search
CPC ...... H04B 7/04; H04B 7/0404; H04B 7/0458; H04B 7/0473; H04B 7/0613; H04L 5/00; H04L 5/001; H04L 5/0023; H04L 5/0044; H04L 5/0048; G01S 7/006; G01S 13/003; G01S 13/347
(Continued)

(56) References Cited

U.S. PATENT DOCUMENTS

| | | | | |
|---|---|---|---|---|
| 2006/0034382 A1* | 2/2006 | Ozluturk | ................ | H04B 7/046 375/267 |
| 2012/0269284 A1* | 10/2012 | Jen | ........................ | H04L 1/0668 375/295 |

(Continued)

FOREIGN PATENT DOCUMENTS

| | | | | |
|---|---|---|---|---|
| CN | 104678395 A | * | 6/2015 | ........... G01S 13/904 |
| CN | 105022034 A | | 11/2015 | |

(Continued)

*Primary Examiner* — Young T. Tse

(74) *Attorney, Agent, or Firm* — Price Heneveld LLP

(57) ABSTRACT

Disclosed in this application are a transmission method and apparatus, a device, and a computer storage medium. The method includes: A first communication device determines a MIMO-OFDM radar data signal based on first information; and the first communication device sends the MIMO-OFDM radar data signal to a second communication device through a transmit antenna. MIMO-OFDM radar data signals of different transmit antennas are orthogonal; and the first information includes one or more of the following: a MIMO precoding manner; a signal multiplexing manner; information about carrier aggregation; and capability information of the second communication device.

19 Claims, 10 Drawing Sheets

---

*501*

A first communication device determines a MIMO-OFDM radar data signal based on first information

*502*

The first communication device sends the MIMO-OFDM radar data signal to a second communication device through a transmit antenna, where MIMO-OFDM radar data signals of different transmit antennas are orthogonal

(58) Field of Classification Search
USPC ......... 375/141, 146, 260–262, 267; 370/208,
370/210, 335, 337, 342, 344, 347
See application file for complete search history.

(56) References Cited

U.S. PATENT DOCUMENTS

| | | | |
|---|---|---|---|
| 2015/0078470 A1* | 3/2015 | Etkin .................. | H04L 25/0236 |
| | | | 375/267 |
| 2018/0287825 A1* | 10/2018 | Chen ................... | H04L 27/2647 |
| 2019/0246405 A1* | 8/2019 | Tong ................... | H04B 7/0697 |
| 2019/0250249 A1 | 8/2019 | Raphaeli et al. | |
| 2020/0036487 A1 | 1/2020 | Hammond et al. | |

FOREIGN PATENT DOCUMENTS

| | | | |
|---|---|---|---|
| CN | 107302516 A | 10/2017 |
| CN | 108983226 A | 12/2018 |
| CN | 110161504 A | 8/2019 |
| CN | 107302516 B | 5/2020 |
| CN | 111585644 A | 8/2020 |
| EP | 3339894 A1 | 7/2017 |
| WO | 2021030685 A1 | 2/2021 |
| WO | 2021062914 A1 | 4/2021 |

* cited by examiner

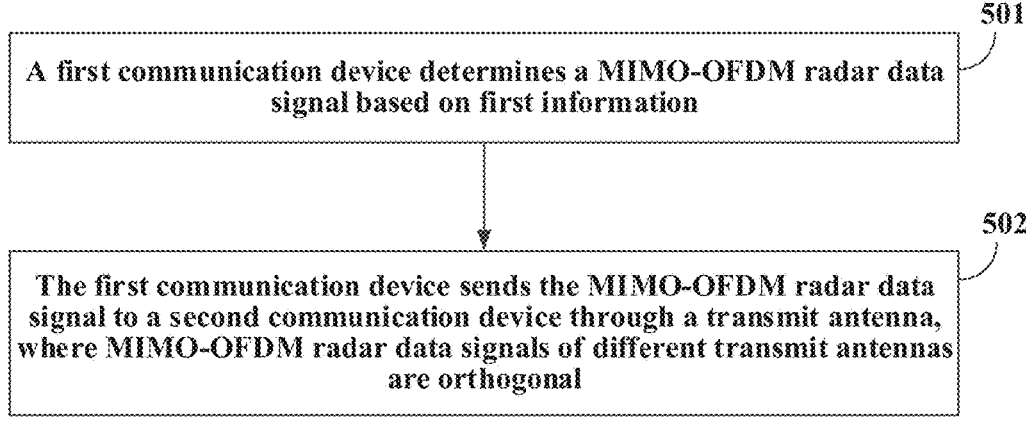
FIG. 5
A second communication device receives a MIMO-OFDM radar data signal sent by a first communication device through a transmit antenna, where MIMO-OFDM radar data signals transmitted by different transmit antennas of the first communication device are orthogonal ⟋ 601
FIG. 6
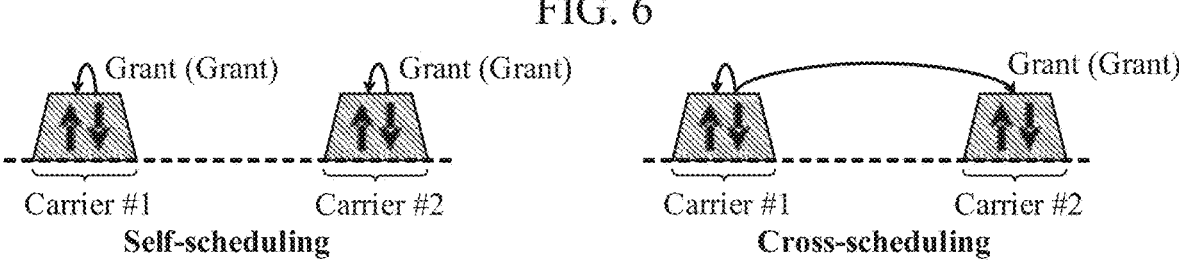
FIG. 7

Transmit
block $A_8F$    $A_7F$              $A_3F$    $A_2F$    $A_1F$        #1

$d_1$ —→   $F_1$  $F_1$  $F_1$  $F_1$  $F_1$  $F_1$  $F_1$  $F_1$        #2

$d_2$ —→   $F_2$  $F_2$  $F_2$  $F_2$  $F_2$  $F_2$  $F_2$  $F_2$        #3

$d_3$ —→   $F_3$  $F_3$  $F_3$  $F_3$  $F_3$  $F_3$  $F_3$  $F_3$        #4

$d_4$ —→   $F_4$  $F_4$  $F_4$  $F_4$  $F_4$  $F_4$  $F_4$  $F_4$

←— Quantity of samples of each Tx radar signal pulse —→ Time

1600

Determining module
1601

First sending module
1602

TRANSMISSION METHOD AND APPARATUS, COMMUNICATION DEVICE, AND COMPUTER STORAGE MEDIUM

CROSS-REFERENCE TO RELATED APPLICATIONS

This application is a Bypass continuation application of PCT International Application No. PCT/CN2022/114165 filed on Aug. 23, 2022, which claims priority to Chinese Patent Application No. 202110997740.7 filed in China on Aug. 27, 2021, which are incorporated herein by reference in their entireties.

TECHNICAL FIELD

Embodiments of this application relate to the field of communication technologies, and specifically, to a transmission method and apparatus, a communication device, and a computer storage medium.

BACKGROUND

Use of a millimeter wave (mmWave) plays a catalytic role for a multiple-input multiple-output (MIMO) radar. Due to inherent characteristics (for example, a high bandwidth and a high frequency) of the millimeter wave, advantages of a small-size antenna and a high resolution can be effectively achieved, and a communication data transmission rate can also be greatly increased. Another advantage of the MIMO radar is that the MIMO radar can simultaneously sense a plurality of reflectors and effectively identify locations of different objects. Therefore, the MIMO radar is an indispensable technology in the field of integrated sensing and communication.

When the reflector is unknown, a transmit antenna of the MIMO radar needs to be orthogonalized. To be specific, each transmit antenna needs to transmit an independent full-azimuth radar waveform. A reason why transmit antennas of the MIMO radar are orthogonal is that in the absence of reflector location information, the MIMO radar transmits full-azimuth sounding signals in space, thereby providing constant power at any location. Therefore, the MIMO radar can effectively sense an angle of arrival (AoA) based on an omnidirectional antenna, a diversity characteristic of MIMO, and a Capon method.

An orthogonal frequency division multiplexing (OFDM) radar is a new technology, which can be applied to a radio system for a communication-radar integration purpose. In the related art, while transmitting an OFDM small data packet, the ODFM radar can produce a radar image and a relevant surrounding environment by receiving and processing an echo of a transmission signal.

The OFDM radar mainly performs discrete Fourier transform (DFT) processing on an echo received signal, performs optimization by using a maximum likelihood estimation (MLE) algorithm, and finally uses dual processing of fast Fourier transform (FFT) and inverse fast Fourier transform (IFFT), to obtain information in a delay-Doppler domain (DD domain), thereby accurately obtaining information about a range and a Doppler frequency shift.

It may be understood that, an OFDM radar does not need to optimize transmission data, because during detection, a received data symbol is removed before being converted into the DD domain. Therefore, a requirement of the OFDM radar on the transmission data does not need to be considered.

A MIMO-OFDM radar combines features of the MIMO radar and the OFDM radar, and is also a recently proposed new technology. The MIMO-OFDM radar has detection capabilities of both the MIMO radar and the OFDM radar. Therefore, compared with a single-technology radar, the MIMO-OFDM radar has better performance in detecting a range, a speed, an angle, and the like, and has a stronger communication capability. For example, regional surveillance of a plurality of portable wireless networks can be implemented by using the MIMO-OFDM radar.

How to obtain a MIMO-OFDM radar data signal is an urgent problem to be resolved.

SUMMARY

Embodiments of this application provides a transmission method and apparatus, a communication device, and a computer storage medium.

According to a first aspect, a transmission method is provided, including:

determining, by a first communication device, a MIMO-OFDM radar data signal based on first information; and sending, by the first communication device, the MIMO-OFDM radar data signal to a second communication device through a transmit antenna, where MIMO-OFDM radar data signals of different transmit antennas are orthogonal; and the first information includes one or more of the following:

a MIMO precoding manner;

a signal multiplexing manner;

information about carrier aggregation; and capability information of the second communication device.

According to a second aspect, a transmission method is provided, including:

receiving, by a second communication device, a MIMO-OFDM radar data signal sent by a first communication device through a transmit antenna, where MIMO-OFDM radar data signals transmitted by different transmit antennas of the first communication device are orthogonal; and the MIMO-OFDM radar data signal is determined by the first communication device based on first information, and the first information includes one or more of the following:

a MIMO precoding manner;

a signal multiplexing manner;

information about carrier aggregation; and capability information of the second communication device.

According to a third aspect, a transmission apparatus is provided, used in a first communication device and including:

a determining module, configured to determine a MIMO-OFDM radar data signal based on first information; and a first sending module, configured to send the MIMO-OFDM radar data signal to a second communication device through a transmit antenna, where MIMO-OFDM radar data signals of different transmit antennas are orthogonal; and the first information includes one or more of the following:

a MIMO precoding manner;

a signal multiplexing manner;

information about carrier aggregation; and capability information of the second communication device.

According to a fourth aspect, a transmission apparatus is provided, used in a second communication device and including:

a second receiving module, configured to receive, by the second communication device, a MIMO-OFDM radar data signal sent by a first communication device through a transmit antenna, where MIMO-OFDM radar data signals transmitted by different transmit antennas of the first communication device are orthogonal; and the MIMO-OFDM radar data signal is determined by the first communication device based on first information, and the first information includes one or more of the following:

a MIMO precoding manner;

a signal multiplexing manner;

information about carrier aggregation; and capability information of the second communication device.

According to a fifth aspect, a communication device is provided, including: a processor, a memory, and a program stored on the memory and executable on the processor, where when the program is executed by the processor, the steps of the method according to the first aspect or second aspect are implemented.

According to a sixth aspect, a non-transitory readable storage medium is provided, storing a program or instructions, where when the program or the instructions are executed by a processor, the steps of the method according to the first aspect or the second aspect are implemented.

According to a seventh aspect, a computer program/ program product is provided, where the computer program/ program product is stored in a non-transitory storage medium, and the computer program/program product is executed by at least one processor to implement the steps of the processing method according to the first aspect or the second aspect.

According to an eighth aspect, a chip is provided, where the chip includes a processor and a communication interface, the communication interface is coupled to the processor, and the processor is configured to run a program or instructions to implement the processing method according to the first aspect or the second aspect.

According to a ninth aspect, a communication device is provided, configured to perform the steps of the method according to the first aspect or the second aspect.

BRIEF DESCRIPTION OF THE DRAWINGS

FIG. 5 is a first schematic diagram of a transmission method according to an embodiment of this application;

FIG. 6 is a second schematic diagram of a transmission method according to an embodiment of this application;

FIG. 7 is a schematic diagram of a scheduling manner for carrier aggregation;

DETAILED DESCRIPTION

For ease of better understanding of embodiments of this application, the following technical points are first described below.

1. About an Integrated Sensing and Communication (ISAC) Model

There are two types of ISAC models.

A first type of model is a co-located antenna based device-free sensing system; and a second type of model is a distributed antenna based device-free sensing system.

Figure 1:
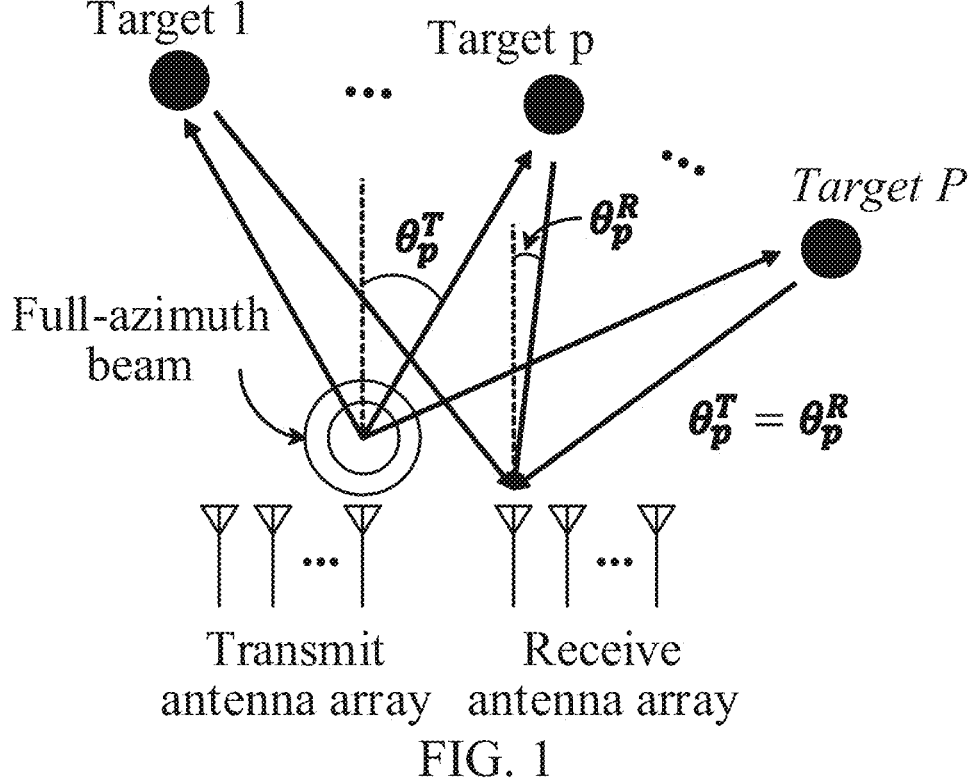
FIG. 1 is a first schematic diagram of an ISAC model.

As shown in FIG. 1, when the first type of model is used, azimuth angles of transmit and receive ends are the same, in other words, $$\theta_p^T = \theta_p^R.$$

Because a MIMO radar sends independent radar signals on different transmit antennas, a waveform diversity gain of the MIMO radar can be achieved.

Figure 2:
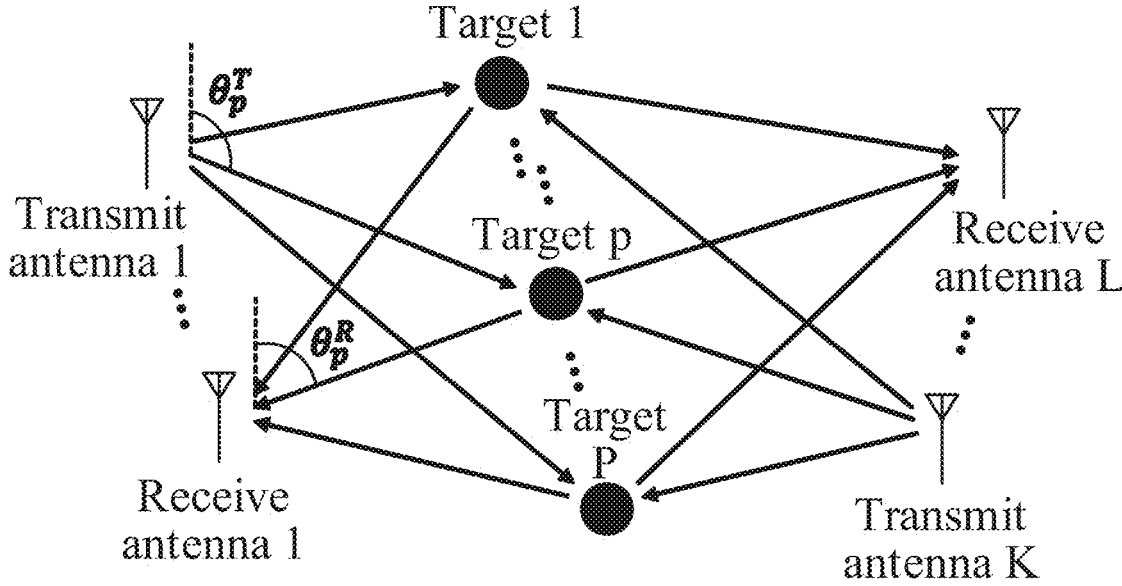
FIG. 2 is a second schematic diagram of an ISAC model.

As shown in FIG. 2, when the second type of model is used, azimuth angles of transmit and receive ends are different, in other words, $$\theta_p^T \neq \theta_p^R.$$

However, in the second type of model, $$\theta_p^T$$

can be calculated by using $$\theta_p^R.$$

Therefore, performance that can be achieved by using the two types of models should be equivalent.

Because a distributed antenna sends an independent radar signal and the independent radar signal is received by a distributed antenna. Therefore, a receiving radar can sense a same target a plurality of times from different directions, thereby achieving a spatial diversity gain and improving sensing accuracy.

In ISAC, three types of entities are considered. A first type is an ISAC entity, namely, an entity with a function of sending (including a radar wave and data information for another entity) and receiving (including a reflected radar wave and data information from another entity), which is named a transmitter/sensing entity (TS entity) herein. For example, a base station of a cellular network, or a vehicle (equipped with a radar and a communication module function) in a vehicle-to-everything (V2X) application.

It may be understood that, a receiving function of the TS entity in this specification is receiving radar wave information that is transmitted and reflected by the TS entity itself. For the sake of simplicity, and in order not to affect technical description of this specification, the TS entity does not receive a data packet sent by another entity.

A second type is a reflect target entity, in other words, the radar wave is reflected when arriving a target entity, while through a reflected wave, the TS entity senses an angle of arrival, a range, and a Doppler frequency shift that are related to the target entity. Herein the reflect target entity is named a reflect object entity (RO entity). The RO entity does not need to have the function of sending and receiving. For example, a conventional vehicle without a communication function.

A third type is a data receiving entity, in other words, the TS entity also carries communication data while transmitting the radar wave, and the data receiving entity is interested in only the communication data, so that the data receiving entity is equipped with a communication receiving module. Herein the data receiving entity is named a communication object entity (CO entity). The CO entity receives the communication data, and also reflects the radar wave. For example, a terminal in a cellular network service, or a vehicle (equipped with at least a communication receiving module function) in the V2X application.

The TS entity has a function of sensing and communication, and mainly provides a service of sensing an object and communicating with a terminal. Each TS entity includes a transmitter and a receiver, where the two are located at a same location, but are physically separated from each other, and have no signal interference with each other. Information exchange can be performed between the transmitter and the receiver, so that the receiver knows data information sent by the transmitter, for use in radar data processing. In addition, each transmitter is equipped with K transmit antennas, and each receiver is equipped with L receive antennas.

The TS entity senses $P_{RO}$ RO entities and mainly detects an AoA, a range, and a Doppler frequency shift. In addition, the TS entity also senses $P_{CO}$ CO entities, and further simultaneously provides a communication service. $P=P_{RO}+P_{CO}$. However, each CO entity needs to receive a data packet sent from the TS entity.

2. Radar Detection Technology

AoA sensing may relay on a conventional subspace-based algorithm, such as multiple signal classification (MUSIC), estimation of signal parameters using rotational invariance techniques (ESPRIT), or matrix pencil. The subspace-based algorithm is mainly for sensing an unknown reflected object.

In addition, beamforming for a known object may rely on a conventional algorithm, such as a Capon method (namely, minimum variance distortionless response (MVDR)), a delay and sum beamformer, or a signal-to-noise ratio (SNR) maximizer.

In the following discussion, the conventional MUSIC algorithm is mainly used for sensing the AoA, and the conventional MVDR algorithm is used for beamforming.

3. Code Division Multiplexing (CDM) Characteristic-Based MIMO-OFDM Radar Waveform Design Method In the method, a MIMO-OFDM data signal is precoded in a time domain and/or a frequency domain by using a CDM orthogonal method, to obtain a new orthogonal radar waveform for a transmit antenna. The radar waveform can not only provide accurate radar sensing performance, but also effectively transmit the MIMO-OFDM data signal. In addition, a radar transmit end can effectively control a parameter of the radar waveform based on a service requirement, to optimize communication and sensing performance.

However, it may be understood that, the new MIMO-OFDM radar waveform requires redesigning or modifying signaling, and therefore is unavailable to a legacy UE.

4. About a New Radio (NR) MIMO Technology

In an NR MIMO protocol, a terminal may assume that a demodulation reference signal (DM-RS) and data are jointly precoded. Downlink multi-antenna precoding is transparent to each receive end of the terminal. Therefore, a network may use any precoding at a transmit end without informing the receive end of relative information of precoding. Therefore, an impact of the downlink multi-antenna precoding on the protocol is mainly related to measurement and a report of PDSCH transmission precoding. For example, a channel status information (CSI) report includes one or more of the following: a rank indicator (RI), a precoder-matrix indicator (PMI), and a channel quality indicator (CQI).

Figure 3:
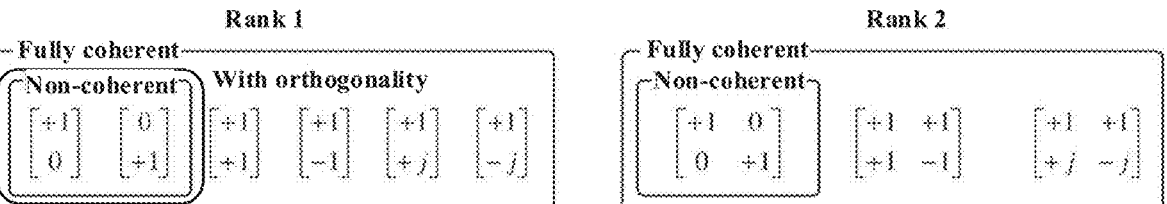
FIG. 3 is a schematic diagram of Rank 1 and Rank 2 codebooks.

For an uplink, the network determines an uplink transmission parameter in an uplink scheduling grant, and a corresponding precoding matrix for transmission. Based on measurement of a configured sounding reference signal (SRS), the network may sound a channel and select a relevant transmission parameter and precoding matrix. When uplink/downlink reciprocity does not hold, a codebook-based precoding method is generally used. Codebooks for two antenna ports are shown in FIG. 3, including Rank 1 and Rank 2 codebooks.

Figure 4:
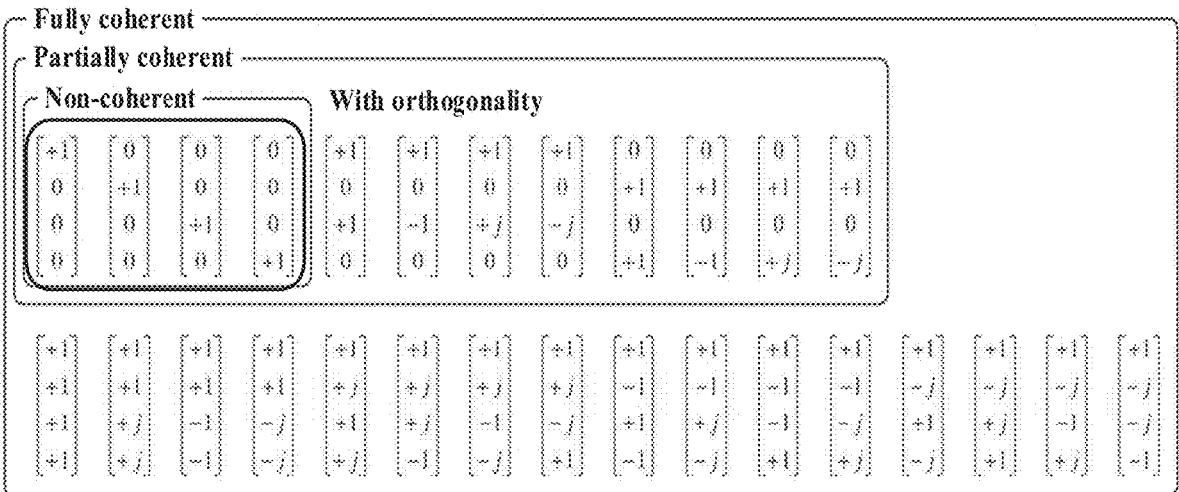
FIG. 4 is a schematic diagram of a Rank-1 precoding codebook matrix for four antenna ports.

It may be understood that, if a no coherent codebook is selected, which is equivalent to an antenna selection method, transmit antennas are orthogonal to each other. FIG. 4 shows a Rank-1 precoding codebook matrix for four antenna ports.

The following clearly describes technical solutions in the embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application shall fall within the protection scope of this application.

Terms "first", "second", and the like in the specification and claims of this application are intended to distinguish similar objects, but are not intended to describe a specific sequence or order. It should be understood that the terms used in such a way are interchangeable in proper circumstances, so that the embodiments of this application can be implemented in other sequences than the sequences illustrated or described herein, and the objects distinguished through "first" and "second" are generally of a same type and a quantity of objects are not limited, for example, a first object may be one or more than one. In addition, "and" in this specification and the claims represents at least one of connected objects, and a character "/" generally indicates an "or" relationship between associated objects.

It is to be noted that the technologies described in the embodiments of this application are not limited to a new radio (NR) system, a long term evolution (LTE)/LTE-advanced (LTE-A) system, and may be further applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technologies described can be applied to the systems and radio technologies mentioned above, and can also be applied to other systems and radio technologies. The following exemplarily describes an NR system, and NR terms are used in most of the description below. However, these technologies can also be applied to an application, for example, a $6^{th}$ generation (6G) communication system, other than an NR system application.

Refer to FIG. 5. An embodiment of this application provides a transmission method, and a specific step includes: step 501 and step 502.

Step 501: A first communication device determines a MIMO-OFDM radar data signal based on first information.

Step 502: The first communication device sends the MIMO-OFDM radar data signal to a second communication device through a transmit antenna, where MIMO-OFDM radar data signals of different transmit antennas are orthogonal; and the first information includes one or more of the following:
(1) a MIMO precoding manner;
(2) a signal multiplexing manner;
(3) information about carrier aggregation; and
(4) capability information of the second communication device.

The foregoing first communication device may be described as a transmit end, for example, a network side device. The second communication device may be described as a receive end, for example, a terminal.

The network side device may be a base station or a core network, where the base station may be referred to as an access point, a base transceiver station (BTS), a radio base station, a radio transceiver, a basic service set (BSS), an extended service set (ESS), a B node, an evolved B node (CNB), a home B node, a home evolved B node, a wireless local area network (WLAN) access point, a wireless network communication technology (WiFi) node, a transmitting receiving point (TRP), a wireless access network node, or another appropriate term in the field as long as reaching the same technical effect. The base station is not limited to a specific technical word. It is to be noted that, the base station in the NR system is only used as an example in the embodiments of this application, but a specific type of the base station is not limited.

The terminal may be a terminal side device, such as a mobile phone, a tablet personal computer, a laptop computer also referred to as a notebook computer, a personal digital assistant (PDA), a handheld computer, a netbook, an ultra-mobile personal computer (UMPC), a mobile Internet device (MID), an augmented reality (AR)/virtual reality (VR) device, a robot, a wearable device, vehicle user equipment (VUE), pedestrian user equipment (PUE), or smart household (a home device, such as a refrigerator, a TV, or a washing machine or furniture, with a wireless communication function). The wearable device includes: a smart watch, a smart hand ring, a smart headset, a pair of smart glasses, smart jewelry (a smart bangle, a smart bracelet, a smart ring, a smart necklace, a smart ankle bangle, a smart anklet, or the like), a smart wristband, smart clothing, a game console, or the like. It is to be noted that, a specific type of the terminal is not limited in the embodiments of this application.

In an embodiment of this application, when the first information includes the MIMO precoding manner, the step that a first communication device determines a MIMO-OFDM radar data signal based on first information includes:
that the first communication device precodes a MIMO-OFDM data signal in one or more of a time domain, a frequency domain, and a spatial domain in the MIMO precoding manner, to obtain a MIMO-OFDM radar data signal of each transmit antenna.

In this application, OFDM data is precoded in the time domain/frequency domain/spatial domain by using a MIMO Pre-coding method in an NR standard protocol, so that a new orthogonal radar waveform adapted to each transmit antenna is obtained. The orthogonal radar waveform can not only provide accurate radar sensing performance, but also effectively transmit the MIMO-OFDM data signal.

In an embodiment of this application, when the first information includes the signal multiplexing manner, the step that a first communication device determines a MIMO-OFDM radar data signal based on first information includes:
that the first communication device obtains a MIMO-OFDM radar data signal of each transmit antenna in the signal multiplexing manner, where
the signal multiplexing manner includes one of the following:
(1) a time division multiplexing (TDM) mode;
(2) a frequency division multiplexing (FDM) mode;
(3) the TDM and the FDM;
(4) a code division multiplexing (CDM) mode and the TDM;
(5) the CDM and the FDM; and
(6) the CDM, the TDM, and the FDM.

In an embodiment of this application, when the first information includes the information about the carrier aggregation, the step that a first communication device determines a MIMO-OFDM radar data signal based on first information, and the method further include:
that the first communication device maps MIMO-OFDM radar data signals on different component carriers in the carrier aggregation to different transmit antennas based on the information about the carrier aggregation, where the component carriers are orthogonal to each other.

Effectively, the new orthogonal radar waveform may be achieved by using a carrier aggregation method in the related art. By mapping mutually orthogonal component carriers to different transmit antennas, orthogonality of radar signals of the transmit antennas is guaranteed based on the NR standard protocol in related art.

It may be understood that, the foregoing precoding processing has a great impact on the related art, and particularly, physical layer signaling (for example, a physical downlink control channel (PDCCH)) needs to be substantially modified or redesigned. A radar transmit end knows a transmit waveform in advance and there is no impact generated during receiving. However, transmission of a data packet is also considered for a MIMO-OFDM radar waveform of ISAC. A data receive end obtains information related to the MIMO-OFDM radar waveform in downlink control information (DCI) by decoding the PDCCH, and then the data packet can be decoded. In this way, a PDCCH format needs to be redesigned or modified to implement signaling of a new radar waveform. A receive end (for example, a legacy UE) in the related art cannot interpret the newly designed or modified PDCCH format, so that the receive end cannot correctly receive the decoded data packet.

In an embodiment of this application, the method further includes:

that the first communication device sends the first information to the second communication device, where the first information indicates to obtain FDM-based or TDM-FDM-based orthogonal MIMO-OFDM radar data signals by mapping signals on the component carriers to corresponding transmit antennas, and the first information is carried in downlink control information (DCI) information.

In an embodiment of this application, there are a plurality of pieces of first information, and the first information is in a one-to-one correspondence with the component carriers. Therefore, the FDM-based or TDM-FDM-based orthogonal MIMO-OFDM radar data signals can be indicated without modifying the NR standard protocol.

In an embodiment of this application, the method further includes:

that the first communication device sends second information to the second communication device in a component carrier scheduling manner, where the second information indicates information about FDM-based or TDM-FDM-based orthogonal MIMO-OFDM radar data signals, and the second information is carried in DCI information; and the scheduling manner includes at least one of a component carrier self-scheduling manner and a component carrier cross-scheduling manner.

In an embodiment of this application, when the scheduling manner is the self-scheduling manner, a quantity of pieces of second information is the same as a quantity of component carriers; and when the scheduling manner is the cross-scheduling manner, a quantity of pieces of second information is a half of a quantity of component carriers.

In an embodiment of this application, a format of the DCI information is a DCI format 0_2 or a DCI format 1_2, and a first field in the DCI format 0_2 or the DCI format 1_2 indicates one component carrier.

In an embodiment of this application, after the step that a first communication device determines a multiple-input multiple-output-orthogonal frequency division multiplexing MIMO-OFDM radar data signal based on first information, the method further includes:

that the first communication device sends third information to the second communication device, where the third information indicates information about TDM-based orthogonal MIMO-OFDM radar data signals, the TDM-based orthogonal MIMO-OFDM radar data signals simultaneously use a same transmit antenna and a same band resource, and the third information is carried in DCI information.

In an embodiment of this application, after the step that a first communication device determines a multiple-input multiple-output-orthogonal frequency division multiplexing MIMO-OFDM radar data signal based on first information, the method further includes:

that the first communication device sends fourth information to the second communication device, where the fourth information indicates information about FDM-based or TDM-FDM-based orthogonal MIMO-OFDM radar data signals, and the fourth information is carried in DCI information; and a format of the DCI information indicates a mapping relationship between a sub-band and a MIMO layer.

In an embodiment of this application, after the step that a first communication device determines a multiple-input multiple-output-orthogonal frequency division multiplexing MIMO-OFDM radar data signal based on first information, the method further includes:

that the first communication device sends fifth information to the second communication device based on the capability information of the second communication device, where the fifth information is carried in DCI information; and the fifth information indicates the first communication device to send radar data information by using FDM-based or TDM-FDM-based orthogonal MIMO-OFDM radar data signals, or the fifth information indicates the first communication device to send radar data information by using TDM-based orthogonal MIMO-OFDM radar data signals.

In an embodiment of this application, when the first information includes the capability information of the second communication device, after the step that a first communication device determines a MIMO-OFDM radar data signal based on first information, the method further includes:

that the first communication device schedules a transmission resource of TDM-based, FDM-based, or TDM-FDM-based orthogonal MIMO-OFDM radar data signals based on the capability information of the second communication device.

In an embodiment of this application, the capability information of the second communication device indicates that the second communication device is a legacy UE, or the second communication device is a novel terminal.

For example, the base station may use conventional PDCCH signaling to schedule the transmission resource of the TDM-based orthogonal MIMO-OFDM radar data signals for the legacy terminal; and the base station may use newly designed PDCCH signaling to schedule the transmission resource of the FDM-based or TDM-FDM-based orthogonal MIMO-OFDM radar data signals for the novel terminal.

The legacy terminal may support a communication protocol version in the related art, while the novel terminal may support a new communication protocol version and the communication protocol version in the related art.

In an embodiment of this application, when the first information includes the capability information of the second communication device, after the step that a first communication device determines a MIMO-OFDM radar data signal based on first information, the method further includes:

that the first communication device receives OFDM data sent by different second communication devices; and the first communication device decodes the OFDM data, and senses a surrounding object target through distributed antennas of the different second communication devices.

In an embodiment of this application, the step that the first communication device schedules a transmission resource of TDM-based, FDM-based, or TDM-FDM-based orthogonal MIMO-OFDM radar data signals based on the capability information of the second communication device includes:

that the first communication device schedules one or more of a time domain resource, a frequency domain resource, and a spatial domain resource of the TDM-based orthogonal MIMO-OFDM radar data signals based on the capability information of the second communication device in the MIMO precoding manner, where the capability information of the second communication device indicates that the second communication device is a legacy terminal;

or that the first communication device schedules one or more of a time domain resource, a frequency domain resource, and a spatial domain resource of the FDM-based or TDM-FDM-based orthogonal MIMO-OFDM radar data signals based on the capability information of the second communication device in the MIMO precoding manner, where the capability information of the second communication device indicates that the second communication device is a novel terminal.

In an embodiment of this application, when the transmit antenna has two antenna ports or four antenna ports, the precoding manner is a non-coherent precoding manner.

In an embodiment of this application, when the first information includes the capability information of the second communication device, after the step that a first communication device determines a MIMO-OFDM radar data signal based on first information, the method further includes:

that the first communication device sends sixth information to the second communication device, where the sixth information indicates information about FDM-based or TDM-FDM-based orthogonal MIMO-OFDM radar data signals, and the sixth information is carried in DCI information carried by a PDCCH.

In an embodiment of this application, the FDM-based or TDM-FDM-based orthogonal MIMO-OFDM radar data signals correspond to rank-1 MIMO;

or the sixth information includes: one or more first indication bits, where each first indication bit corresponds to an antenna port of one transmit antenna;

or the sixth information includes: a second indication bit, where the second indication bit indicates that a sent signal is a MIMO-OFDM data signal or a MIMO-OFDM radar data signal, and a size of the second indication bit is one bit.

In an embodiment of this application, when the second indication bit indicates that a sent signal is a MIMO-OFDM radar data signal, spectrum resource information of the sent MIMO-OFDM radar data signal and a quantity of antenna ports of the transmit antenna are used by the second communication device to determine a boundary location between subbands.

In an embodiment of this application, channel estimation is independently performed in each subband.

In an embodiment of this application, a quantity of bits of the sixth information is the same as a quantity of bits of information carried by a predefined PDCCH, and a format of the sixth information is different from a format of the information carried by the predefined PDCCH. The information carried by the predefined PDCCH is determined based on information carried by a PDCCH defined by the related art or a protocol.

In an embodiment of this application, the DCI information carries one or more of the first information, the second information, the third information, the fourth information, the fifth information, and the sixth information.

It may be understood that, the indication of the orthogonal MIMO-OFDM radar data signals may be indicated by physical layer PDCCH signaling in the related art without modifying a standard in the related art. More effectively, to improve performance of sensing and data reception, a signaling bit may be added to a DCI format 1_1 or a DCI format 0_1 in the PDCCH in the related art, or a DMRS CDM group reserved value is newly defined, to optimize communication and sensing performance.

In the embodiments of this application, the first communication device can determine orthogonal MIMO-OFDM radar data signals based on the MIMO precoding manner, the signal multiplexing manner, the information about carrier aggregation, and/or the capability information of the second communication device. The orthogonal MIMO-OFDM radar data signals can not only provide accurate radar sensing performance, but also effectively transmit MIMO-OFDM data.

Refer to FIG. 6. An embodiment of this application provides a transmission method, and a specific step includes step 601.

Step 601: A second communication device receives a MIMO-OFDM radar data signal sent by a first communication device through a transmit antenna, where MIMO-OFDM radar data signals transmitted by different transmit antennas of the first communication device are orthogonal; and the MIMO-OFDM radar data signal is determined by the first communication device based on first information, and the first information includes one or more of the following:

(1) a MIMO precoding manner;

(2) a signal multiplexing manner;

(3) information about carrier aggregation; and (4) capability information of the second communication device.

In an embodiment of this application, the signal multiplexing manner includes one of the following:

(1) a TDM;

(2) an FDM;

(3) the TDM and the FDM;

(4) a CDM and the TDM;

(5) the CDM and the FDM; and (6) the CDM, the TDM, and the FDM.

In an embodiment of this application, before or after or in the step that a second communication device receives a MIMO-OFDM radar data signal sent by a first communication device through a transmit antenna, the method further includes:

that the second communication device receives the first information from the first communication device, where the first information indicates the first communication device to obtain FDM-based or TDM-FDM-based orthogonal MIMO-OFDM radar data signals by mapping signals on component carriers to corresponding transmit antennas, the first information is carried in DCI information, and the component carriers are orthogonal to each other.

In an embodiment of this application, before or after or in the step that a second communication device receives a MIMO-OFDM radar data signal sent by a first communication device through a transmit antenna, the method further includes:

that the second communication device receives second information from the first communication device, where the second information is sent by the first communication device in a component carrier scheduling manner, the second information indicates information about FDM-based or TDM-FDM-based orthogonal MIMO-OFDM radar data signals, and the second information is carried in DCI information; and the scheduling manner includes at least one of a component carrier self-scheduling manner and a component carrier cross-scheduling manner.

In an embodiment of this application, the method further includes:

that the second communication device receives third information from the first communication device, where the third information indicates information about TDM-based orthogonal MIMO-OFDM radar data signals, the TDM-based orthogonal MIMO-OFDM radar data signals simultaneously use a same transmit antenna and a same band resource, and the third information is carried in DCI information.

In an embodiment of this application, before or after or in the step that a second communication device receives a MIMO-OFDM radar data signal sent by a first communication device through a transmit antenna, the method further includes:

that the second communication device receives fourth information from the first communication device, where the fourth information indicates information about FDM-based or TDM-FDM-based orthogonal MIMO-OFDM radar data signals, and the fourth information is carried in DCI information; and a format of the DCI information indicates a mapping relationship between a subband and a MIMO layer.

In an embodiment of this application, the method further includes:

that the second communication device receives fifth information from the first communication device, where the fifth information is sent by the first communication device based on the capability information of the second communication device, and the fifth information is carried in DCI information; and the fifth information indicates the first communication device to send radar data information by using FDM-based or TDM-FDM-based orthogonal MIMO-OFDM radar data signals, or the fifth information indicates the first communication device to send radar data information by using TDM-based orthogonal MIMO-OFDM radar data signals.

In an embodiment of this application, before or after or in the step that a second communication device receives a MIMO-OFDM radar data signal sent by a first communication device through a transmit antenna, the method further includes:

that the second communication device receives sixth information from the first communication device, where the sixth information indicates information about FDM-based or TDM-FDM-based orthogonal MIMO-OFDM radar data signals, and the sixth information is carried in DCI information.

In an embodiment of this application, the FDM-based or TDM-FDM-based orthogonal MIMO-OFDM radar data signals correspond to rank-1 MIMO;

or the sixth information includes: one or more first indication bits, where each first indication bit corresponds to an antenna port of one transmit antenna;

or the sixth information includes: a second indication bit, where the second indication bit indicates that a sent signal is a MIMO-OFDM data signal or a MIMO-OFDM radar data signal; and a size of the second indication bit is one bit.

In an embodiment of this application, when the second indication bit indicates that a sent signal is a MIMO-OFDM radar data signal, the method further includes:

that the second communication device obtains spectrum resource information of the sent MIMO-OFDM radar data signal and a quantity of antenna ports of the transmit antenna by decoding a PDCCH; and the second communication device determines a boundary location between subbands based on the spectrum resource information of the sent MIMO-OFDM radar data signal and the quantity of antenna ports of the transmit antenna.

In an embodiment of this application, the DCI information carries one or more of the first information, the second information, the third information, the fourth information, the fifth information, and the sixth information.

In the embodiments of this application, the second communication device can receive orthogonal MIMO-OFDM radar data signals sent by the first communication device through different transmit antennas. The orthogonal MIMO-OFDM radar data signals can not only provide accurate radar sensing performance, but also effectively transmit MIMO-OFDM data.

The following describes the embodiments of this application with reference to solutions 1 to 4.

Solution 1: New MIMO-OFDM Waveform Design

In this application, a MIMO-OFDM data signal is precoded in a time domain/frequency domain/spatial domain by using a MIMO Pre-coding method in an NR standard protocol, so that orthogonal MIMO-OFDM radar data signals adapted to each transmit antenna are obtained. The orthogonal MIMO-OFDM radar data signals can be used as a radar to sound and sense an object target, and can also transmit data like a conventional OFDM waveform, to complete a function of integrated sensing and communication.

For example, it is assumed that the foregoing ISAC model includes K transmit antennas, L receive antennas, and P sensing targets. For the sake of simplicity, that the transmit antenna and the receive antenna are located in a same geographical location is considered herein, in other words, a co-located antenna based device-free sensing scene is considered, so that a transmitting azimuth angle and a receiving azimuth angle are both $\theta_p$. The MIMO-OFDM radar data signal is modulated in a MIMO-OFDM manner, so that a received signal on an $m^{th}$ resource element (RE), an $n^{th}$ OFDM symbol, and an $l^{th}$ receive antenna may be represented as:

$$y_{l,n}(m) = \sum_{k=1}^{K-1} \sum_{p=1}^{P} h'_p(\tau_p)[a_R(\theta_p)]_l \left[a_T^T(\theta_p)\right]_k \times [d_k]_{n,m} e^{-j2\pi m\Delta f\tau_p} e^{j2\pi f_{D,p} nT_{sym}}$$

$$h'_p(\tau_p) = h_p \cdot e^{-j2\pi f_c \tau_p} \cdot h_p$$

is a complex amplitude proportional to a radar cross section (RCS) of a $p^{th}$ target, $d_k$ is an N×M radar data matrix transmitted from a $k^{th}$ transmit antenna, M is a quantity of REs in each OFDM symbol, and N is a quantity of samples of each transmitted radar signal pulse.

In addition, for the azimuth angle $\theta_p$, a vector $a_T(\theta_p) \in \mathbb{C}^{K \times 1}$ of the transmit antenna and a vector $a_R(\theta_p) \in \mathbb{C}^{L \times 1}$ the receive antenna may be respectively represented as:

$$a_T(\theta_p) = \left[1, e^{j\frac{2\pi}{\lambda} d_T \sin(\theta_p)}, \ldots, e^{j\frac{2\pi}{\lambda} d_T(K-1)\sin(\theta_p)}\right]^T$$

$$a_R(\theta_p) = \left[1, e^{j\frac{2\pi}{\lambda} d_R \sin(\theta_p)}, \ldots, e^{j\frac{2\pi}{\lambda} d_R(L-1)\sin(\theta_p)}\right]^T$$

$\lambda$, $d_T$, and $d_R$ respectively represent a signal wavelength, and a distance between the transmit antenna and the receive antenna, and a distance between the receive antenna and the transmit antenna.

It may be understood that, if data from different transmit antennas can remain orthogonal, the data $d_k$ in the signal from the $l^{th}$ receive antenna may be removed before radar signal processing. In other words, if the data from the different transmit antennas are orthogonal, MIMO-OFDM data sending has little impact on radar sensing performance. The only thing is that when the data has a high quadrature amplitude modulation (QAM) modulation order, removing a data signal produces an effect of colored noise.

A radar waveform design method in the embodiments of this application is mainly to complete transmission of the data signal while implementing sensing the object target, and additionally minimize an impact (especially an impact on a physical layer of a protocol) on a current NR protocol Therefore, to minimize the impact on the current NR protocol, orthogonality of the MIMO-OFDM radar data signals transmitted by different antennas must be implemented on each OFDM symbol.

Specifically, the following method options may be considered.

Option 1: By using TDM-based orthogonal MIMO-OFDM radar data signals. In other words, each OFDM symbol can be mapped to only one transmit antenna. In this way, signals on different antennas are orthogonal in the time domain.

Option 2: By using FDM-based orthogonal MIMO-OFDM radar data signals. In other words, different frequency domain resources can be selected on each transmit antenna. In this way, signals on different antennas are orthogonal in the frequency domain.

Option 3: By using a combination of the TDM and the FDM for implementation, in other words, by using TDM-FDM-based orthogonal MIMO-OFDM radar data signals. In this way, signals on different antennas are orthogonal in the time domain and the frequency domain.

It is assumed that subbands are $F_1$, $F_2$, ..., $F_M$, where $$F = \sum_{m=1}^{M} F_m,$$

and F is a total system band. An antenna selection matrix may be represented as $A(n) = \text{diag}(\alpha_1, \alpha_2, \ldots, \alpha_K)$, where $\text{diag}(\cdot)$ is a diagonal matrix, K is a quantity of transmit antennas, n is an index for a transmit block in the time domain, n=1, 2, . . . , N, N is a quantity of samples in a MIMO-OFDM radar data signal pulse of each transmit antenna (Transmit Radar Signal Pulse), and $\alpha_k$ is an indication of selection of a $k^{th}$ antenna and is defined as:

$$\begin{cases} a_k = 1 & \text{if the } k^{th} \text{ antenna is in an activated state} \\ a_k = 0 & \text{if the } k^{th} \text{ antenna is in a non-activated state} \end{cases}$$

Therefore, a subband used on an antenna in a transmit block at an $n^{th}$ time may be determined as $A_n F$, where F is a K×1 vector of an optional subband.

It may be understood that, as mentioned above, because the orthogonality of the MIMO-OFDM radar data signals transmitted by the different antennas must be implemented on each OFDM symbol, a time length of the transmit block is equal to a time length of the OFDM symbol.

In a MIMO radar, a receive end receives a MIMO-OFDM radar data signal reflected in each receive antenna, represented by a K×L matrix of each sample or transmit block (N samples in total). According to the Background, the received MIMO-OFDM radar data signal first senses an AoA of the object target by using a conventional algorithm such as MUSIC, and then estimates a range and a Doppler frequency shift of the object target by using a conventional OFDM radar algorithm.

(1) The TDM-based orthogonal MIMO-OFDM radar data signals may be represented as:

$$A_1 F = \begin{bmatrix} 1 & 0 & \ldots & 0 \\ 0 & 0 & \ldots & 0 \\ \vdots & \vdots & \ddots & \vdots \\ 0 & 0 & \ldots & 0 \end{bmatrix} \begin{bmatrix} F \\ F \\ \vdots \\ F \end{bmatrix} = \begin{bmatrix} F \\ 0 \\ \vdots \\ 0 \end{bmatrix}$$

$$A_2 F = \begin{bmatrix} 0 & 0 & \ldots & 0 \\ 0 & 1 & \ldots & 0 \\ \vdots & \vdots & \ddots & \vdots \\ 0 & 0 & \ldots & 0 \end{bmatrix} \begin{bmatrix} F \\ F \\ \vdots \\ F \end{bmatrix} = \begin{bmatrix} 0 \\ F \\ \vdots \\ 0 \end{bmatrix}$$

$$\text{and } A_K F = \begin{bmatrix} 0 & 0 & \ldots & 0 \\ 0 & 0 & \ldots & 0 \\ \vdots & \vdots & \ddots & \vdots \\ 0 & 0 & \ldots & 1 \end{bmatrix} \begin{bmatrix} F \\ F \\ \vdots \\ F \end{bmatrix} = \begin{bmatrix} 0 \\ 0 \\ \vdots \\ F \end{bmatrix}$$

(2) The FDM-based orthogonal MIMO-OFDM radar data signals may be represented as:

$$A_1 F = \begin{bmatrix} 1 & 0 & \ldots & 0 \\ 0 & 1 & \ldots & 0 \\ \vdots & \vdots & \ddots & \vdots \\ 0 & 0 & \ldots & 1 \end{bmatrix} \begin{bmatrix} F_1 \\ F_2 \\ \vdots \\ F_K \end{bmatrix} = \begin{bmatrix} F_1 \\ F_2 \\ \vdots \\ F_K \end{bmatrix}$$

$$A_2 F = \begin{bmatrix} 1 & 0 & \ldots & 0 \\ 0 & 1 & \ldots & 0 \\ \vdots & \vdots & \ddots & \vdots \\ 0 & 0 & \ldots & 1 \end{bmatrix} \begin{bmatrix} F_1 \\ F_2 \\ \vdots \\ F_K \end{bmatrix} = \begin{bmatrix} F_1 \\ F_2 \\ \vdots \\ F_K \end{bmatrix}$$

-continued $$\text{and } A_K F = \begin{bmatrix} 1 & 0 & \dots & 0 \\ 0 & 1 & \dots & 0 \\ \vdots & \vdots & \ddots & \vdots \\ 0 & 0 & \dots & 1 \end{bmatrix} \begin{bmatrix} F_1 \\ F_2 \\ \vdots \\ F_K \end{bmatrix} = \begin{bmatrix} F_1 \\ F_2 \\ \vdots \\ F_K \end{bmatrix}$$

(3) The TDM-FDM-based orthogonal MIMO-OFDM radar data signals may be represented as:

$$A_1 F = \begin{bmatrix} 1 & 0 & \dots & 0 \\ 0 & 1 & \dots & 0 \\ \vdots & \vdots & \ddots & \vdots \\ 0 & 0 & \dots & 0 \end{bmatrix} \begin{bmatrix} F_1 \\ F_2 \\ \vdots \\ F_{K'} \end{bmatrix} = \begin{bmatrix} F_2 \\ F_2 \\ \vdots \\ 0 \end{bmatrix}$$

$$\text{and } A_K F = \begin{bmatrix} 0 & \dots & 0 & 0 \\ \vdots & \ddots & \vdots & 0 \\ 0 & \dots & 1 & 0 \\ 0 & \dots & 0 & 1 \end{bmatrix} \begin{bmatrix} F_1 \\ \vdots \\ F_{K'-1} \\ F_{K'} \end{bmatrix} = \begin{bmatrix} 0 \\ \vdots \\ F_{K'-1} \\ F_{K'} \end{bmatrix}$$

$K'$ is a subband occupied in each OFDM symbol, and $K \geq K'$.

It may be understood that, if $K'=1$, the TDM-FDM-based orthogonal MIMO-OFDM radar data signals are equivalent to the TDM-based orthogonal MIMO-OFDM radar data signals. Likewise, if $K'=K$, the TDM-FDM-based orthogonal MIMO-OFDM radar data signals are equivalent to the FDM-based orthogonal MIMO-OFDM radar data signals.

More effectively, a design for the orthogonal MIMO-OFDM radar data signals may be effectively implemented through a more complex combination method of the CDM, the TDM, and the FDM. For the combination method, a combination of two items, including CDM-TDM and CDM-FDM may be selected, or a combination of three items, CDM-TDM-FDM, may also be selected.

Solution 2: NR-CA-Based Solution

Orthogonal MIMO-OFDM radar data signals of transmit antennas may be resolved through a carrier aggregation (CA) method. Because component carriers (CC) used in carrier aggregation are orthogonal to each other, different component carriers are mapped to different transmit antennas to ensure orthogonality of the MIMO-OFDM radar data signals of the transmit antennas.

Specifically, in NR, an indication problem of FDM-based orthogonal MIMO-OFDM radar data signals can be resolved through the carrier aggregation by mapping signals on component carriers to corresponding transmit antennas. This is because cach component carrier is equipped with independent physical downlink control channel (PDCCH) control signaling. Therefore, FDM-based or TDM-FDM-based orthogonal MIMO-OFDM radar data signals may be achieved without modifying an NR standard protocol.

More specifically, in the carrier aggregation, a medium access control (MAC) entity is responsible for cross-component carrier scheduling data packet transmission. A basic principle of the carrier aggregation is to independently process, at a physical layer, the component carrier, including the control signaling, scheduling, and a hybrid automatic repeat request (HARQ) retransmission. Therefore, a scheduler in MAC may allocate and map different component carriers to different transmit antennas, and notify the physical layer to send corresponding OFDM data signals. For a data receiving user, a conventional OFDM demodulation method may be used, where a PDCCH is first decoded, and then a data packet on a physical downlink shared channel (PDSCH) is decoded based on a requirement. For a radar receiver, a conventional MIMO-OFDM demodulation method may also be used, where a data signal is first removed, and then sensing processing is performed on an object target.

It may be understood that, an advantage of using the CA for the orthogonal MIMO-OFDM radar data signals of the transmit antennas is that there is no impact on the NR standard protocol in related art. However, a disadvantage is that different antennas can schedule only resources of different carriers, resulting in reduction of MIMO scheduling flexibility. In addition, for data sending and receiving, a diversity gain of MIMO is lost.

As shown in FIG. 7, there are two scheduling manners in the carrier aggregation: a component carrier self-scheduling manner and a component carrier cross-scheduling manner.

If PDCCH cross-component carrier scheduling configuration (CrossCarrierSchedulingConfig) is involved, carrierIndicatorSizeDCI-0-2 or carrierIndicatorSizeDCI-1-2 (0, 1, 2 or 3 bits) may indicate a component carrier ID.

It may be understood that, a component carrier indication field in a DCI format 0_2 or a DCI format 1_2 can indicate only one component carrier. If the self-scheduling is used for authorization, $K'$ PDCCHs are required to indicate $K'$ component carriers. If the cross-scheduling is used for authorization, $K'/2$ PDCCHs are required to indicate $K'$ component carriers.

It may be understood that, a quantity of component carriers is required to be guaranteed to a specified extent to achieve the orthogonal MIMO-OFDM radar data signals of the transmit antennas and implement FDM-based or TDM-FDM-based MIMO-OFDM radar sensing. In general, a quantity of available component carriers is much smaller than a required quantity (to be specific, compared with a quantity of antenna ports). In addition, if a frequency domain spacing width of a component carrier is large, different component carriers may have totally different channel characteristics, resulting in increased ambiguity in sensing an AoA, a range, and a Doppler frequency shift.

It may be understood that, in the NR standard protocol, an objective of using the CA is mainly to increase a peak data rate. However, a high peak data rate is not in demand in many practical applications. Therefore, although using the carrier aggregation to design the MIMO-OFDM radar data signal is simple and there is no need to modify the NR standard protocol, the carrier aggregation has a specified limitation in a practical application.

Solution 3: NR MIMO Precoding-Based Solution

Downlink multi-antenna precoding is transparent to a terminal, and a network can use any transmit precoding without informing the terminal of relevant precoding that is used. Therefore, a solution to TDM-based orthogonal MIMO-OFDM radar data signals, FDM-based orthogonal MIMO-OFDM radar data signals, or a combination of the two may be provided by a base station (gNB) or a remote radio head (RRH) using an implementation method in a downlink.

In a current NR standard protocol, one PDCCH only allows MIMO-OFDM transmission indicating a same band resource. Therefore, achieving the TDM-based orthogonal MIMO-OFDM radar data signal does not require changing any standard protocol. This is because in a method for the TDM-based orthogonal MIMO-OFDM radar data signals, a single transmit antenna and a single band resource are simultaneously used, which is equivalent to a single-input multiple-output (SIMO) scene.

To achieve FDM-based or TDM-FDM-based orthogonal MIMO-OFDM radar data signals, PDCCH content in the related art is required to be modified, or a PDCCH format is required to be redesigned. A mapping relationship between a subband and a MIMO layer may be indicated by using a new PDCCH format. Therefore, there is a specified impact on the NR standard protocol in the related art.

It may be understood that, if the MIMO-OFDM radar data signal is received by a Legacy UE in the related art, a radar transmit end can send radar data information only by the method for the TDM-based orthogonal MIMO-OFDM radar data signals. If the MIMO-OFDM radar data signal is received by a novel UE terminal, a radar transmit end can send radar data information by a method for FDM-based or TDM-FDM-based orthogonal MIMO-OFDM radar data signals.

In downlink transmission, the gNB may send the radar data information by using the TDM-based, FDM-based, or TDM-FDM-based orthogonal MIMO-OFDM radar data signals for different UE. Specifically, the gNB uses the TDM-based orthogonal MIMO-OFDM radar data signals for the conventional UE terminal, while the gNB uses the FDM-based or TDM-FDM-based orthogonal MIMO-OFDM radar data signals for the novel UE terminal. In general, the gNB knows a UE capability in advance. Therefore, this transmission method is very effective, and the gNB may use conventional PDCCH signaling to complete data transmission for the conventional UE terminal, and use newly designed PDCCH signaling to complete data transmission for the novel UE terminal.

The gNB determines a quantity of MIMO layers for uplink transmission and a corresponding precoding matrix for transmission through an uplink scheduling grant. In uplink scheduling, likewise, the gNB may schedule relevant transmission resources of the TDM-based, FDM-based, or TDM-FDM-based orthogonal MIMO-OFDM radar data signals for different UE. Specifically, the gNB may schedule relevant transmission resources of the TDM-based orthogonal MIMO-OFDM radar data signals for the conventional UE terminal by using the conventional PDCCH, and schedule transmission resources of the FDM-based or TDM-FDM-based orthogonal MIMO-OFDM radar data signals for the novel UE terminal by using the newly designed PDCCH. More effectively, the gNB receives OFDM data packets sent by different UE terminals, and OFDM data is decoded through a conventional OFDM demodulation method, and a surrounding object target is simultaneously sensed by using distributed antennas of the different UE.

In uplink scheduling, the gNB may schedule a time domain, frequency domain, and spatial domain resource for the conventional UE by using NR MIMO precoding in the related art.

Specifically, in a case of two and four antenna ports, the gNB may use non-coherent precoding.

For Rank 1 with two antenna ports, the gNB may use a codebook $$\begin{bmatrix} +1 \\ 0 \end{bmatrix} \text{ or } \begin{bmatrix} 0 \\ +1 \end{bmatrix},$$

and the codebook is equivalent to the method for the TDM-based orthogonal MIMO-OFDM radar data signals.

For Rank 1 with four antenna ports, the gNB may use a codebook $$\begin{bmatrix} +1 & 0 & 0 & 0 \\ 0 & +1 & 0 & 0 \\ 0 & 0 & +1 & 0 \\ 0 & 0 & 0 & +1 \end{bmatrix},$$

and the codebook is equivalent to the method for the TDM-based orthogonal MIMO-OFDM radar data signals.

It may be understood that, the method in which the gNB schedules an uplink does not have any impact on the standard protocol in the related art, and can simultaneously complete requirements for data communication and radar sensing. In other words, for data communication, a waveform is maintained the same as that of conventional OFDM; however, for radar sensing, a sensing function of MIMO-OFDM can be implemented based on multi-user multi-antenna orthogonal scheduling transmission.

For Rank 2 with two antenna ports, the gNB may use a codebook $$\begin{bmatrix} +1 & 0 \\ 0 & +1 \end{bmatrix},$$

and the codebook is equivalent to a method for the FDM-based orthogonal MIMO-OFDM radar data signals.

It may be understood that, use of the codebook $$\begin{bmatrix} +1 & 0 \\ 0 & +1 \end{bmatrix}$$

requires using the newly designed PDCCH to indicate frequency domain resource information.

Solution 4: Specific Design for NR MIMO

During using a single-carrier, to more efficiently achieve FDM-based or TDM-FDM-based orthogonal MIMO-OFDM radar data signals, a specified modification may be made to an NR physical layer protocol. An objective of modifying the NR physical layer protocol is to achieve a greater diversity gain for radar reception, thereby obtaining better sensing performance, and to achieve an extra spatial diversity gain for data reception, thereby improving block error rate (BLER) performance.

Specifically, there are the following three options for achieving the TDM-FDM-based orthogonal MIMO-OFDM radar data signals.

Option 1: No modification is made to a conventional PDCCH. The FDM-based or TDM-FDM-based orthogonal MIMO-OFDM radar data signals may be seen as frequency channel permutations among a plurality of antennas, and therefore may be regarded as 1×L SIMO. Therefore, rank 1 MIMO may be indicated by using only the conventional PDCCH.

Option 2: Each antenna port is indicated by using a PDCCH. Because a radar transmit end has K transmit antennas, K bits are required for independent indication. An advantage of this option is that a mapping relationship is simple, but K bits are required to be added to DCI.

Figure 8:
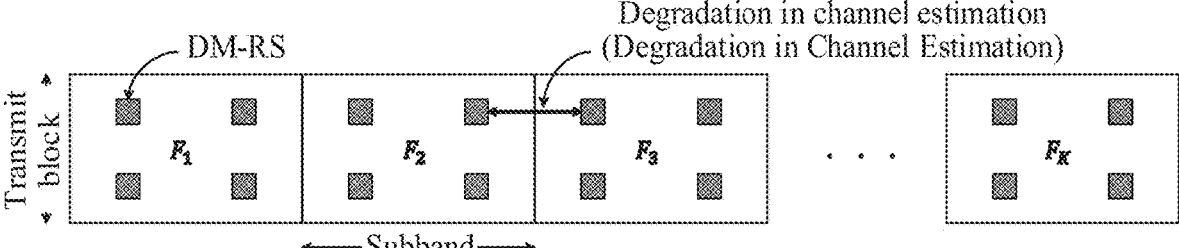
FIG. 8 is a schematic diagram of mapping different subbands to different transmit antennas.

It may be understood that channel estimation performance is reduced because a receive end UE does not know permutations of subband channels. As shown in FIG. 8, channels at a boundary between two subbands are totally different because different subbands are mapped to different transmit antennas. When an entire channel is estimated by using a DM-RS, channel estimation in each subband may be smoothly performed. However, because a receive end does not know a boundary between subbands, if a conventional channel estimation interpolation method is used, there is a large error of channel estimation at the boundary, thereby having a great impact on data decoding performance.

Option 3: One bit is added to DCI to indicate a boundary location between subbands.

For example, whether a sent signal is a pure MIMO-OFDM signal or a MIMO-OFDM radar data signal is indicated by using one bit. If the sent signal is a pure MIMO-OFDM signal, a data receive end may decode data through a conventional MIMO-OFDM demodulation method. If the sent signal is a MIMO-OFDM radar data signal, a data receive end may first determine a boundary location between subbands, and then perform independent channel estimation for each subband.

For example, because one bit cannot directly indicate the boundary location between subbands, the data receive end must implicitly obtain the boundary location between subbands by using information in a PDCCH. The data receive end first obtains spectrum resource information F of the sent signal from the PDCCH, and simultaneously obtains a quantity K of antenna ports. Because subbands mapped to all antenna ports are equal in length, the data receive end may indirectly calculate the boundary location between subbands by calculating F/K.

For example, by using the method of option 3, channel estimation may be independently performed in each subband, so that an error of channel estimation at the boundary may be eliminated.

It may be understood that, in option 3, a design of FDM-based or TDM-FDM-based orthogonal MIMO-OFDM radar data signals can be effectively implemented only by adding one bit to the PDCCH.

For example, during redesigning the PDCCH, a new DCI format with a same quantity (or size) of bits may be used to indicate the MIMO-OFDM data signal or the MIMO-OFDM radar data signal. An advantage of the design is that although the DCI format is reintroduced, an overall quantity of bits of the DCI does not change, a burden of blind detection of the PDCCH does not need to be added to the data receive end.

It may be understood that, compared with conventional MIMO-OFDM, MIMO-OFDM radar data communication is simple, and therefore requires a small quantity of bits, so that a same quantity of bits can be maintained for redesigning the DCI format.

Embodiment 1

Solution 1 is described in detail through embodiment 1.

When TDM-based orthogonal MIMO-OFDM radar data signals are considered, an OFDM transmit block corresponds to an antenna, which is equivalent to switching of a MIMO antenna in a time domain. Because orthogonality of signals transmitted by different antennas in this application must be implemented on each OFDM symbol, a time length of the transmit block is equal to a time length of the OFDM symbol.

Figures 9, 10:
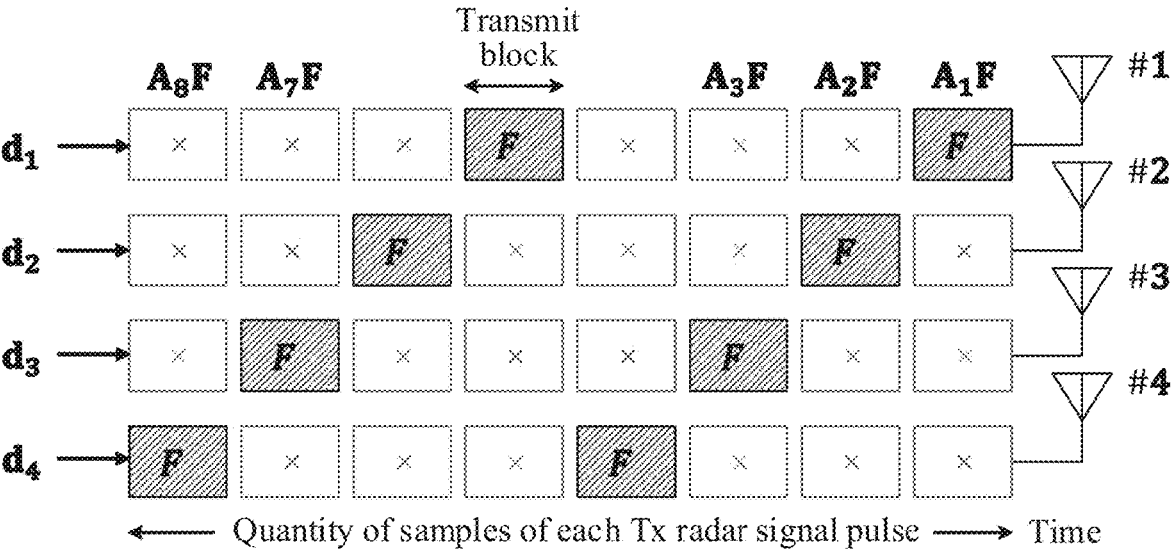
FIG. 9 is a schematic diagram of TDM-based orthogonal MIMO-OFDM radar data signals according to an embodiment of this application.
FIG. 10 is a schematic diagram of FDM-based orthogonal MIMO-OFDM radar data signals according to an embodiment of this application.

As shown in FIG. 9, a quantity K of antenna ports equals 4, and a quantity N of samples of a transmitted MIMO-OFDM radar data signal pulse equals 8. In general, N and K are directly proportional to each other, in other words, $N=JK$, and J is an integer. In this embodiment, $J=2$, in other words, in a sample of a transmitted MIMO-OFDM radar data signal pulse, each antenna has an opportunity to send a MIMO-OFDM radar data signal twice.

In addition, it may be seen from the embodiment shown in FIG. 9 that a quantity of MIMO layers is 1. Therefore, all transmit antennas are orthogonal to each other in the time domain. Therefore, a PDCCH format in the related art may be used to inform a data receive end of signaling information related to MIMO data. Therefore, there is no need to redesign or modify an NR PDCCH in the related art.

When FDM-based orthogonal MIMO-OFDM radar data signals are considered, an OFDM transmit block corresponds to K antennas, which is equivalent to a MIMO antenna permutation. As shown in FIG. 10, a quantity K of antenna ports equals 4, and a quantity N of samples of a transmitted MIMO-OFDM radar data signal pulse equals 8. Subbands are $F_1$, $F_2$, $F_3$, and $F_4$ respectively, and a width of the subband is F/K.

It may be seen from the embodiment that a quantity of MIMO layers is K, in other words, $K=4$. All subbands mapped to transmit antennas are different, in other words, the transmit antennas are orthogonal to each other. However, the PDCCH format in the related art can indicate only MIMO information of a same subband. To inform the data receive end of the signaling information related to the MIMO data, the PDCCH in the related art is required to be redesigned or modified.

Figure 11:
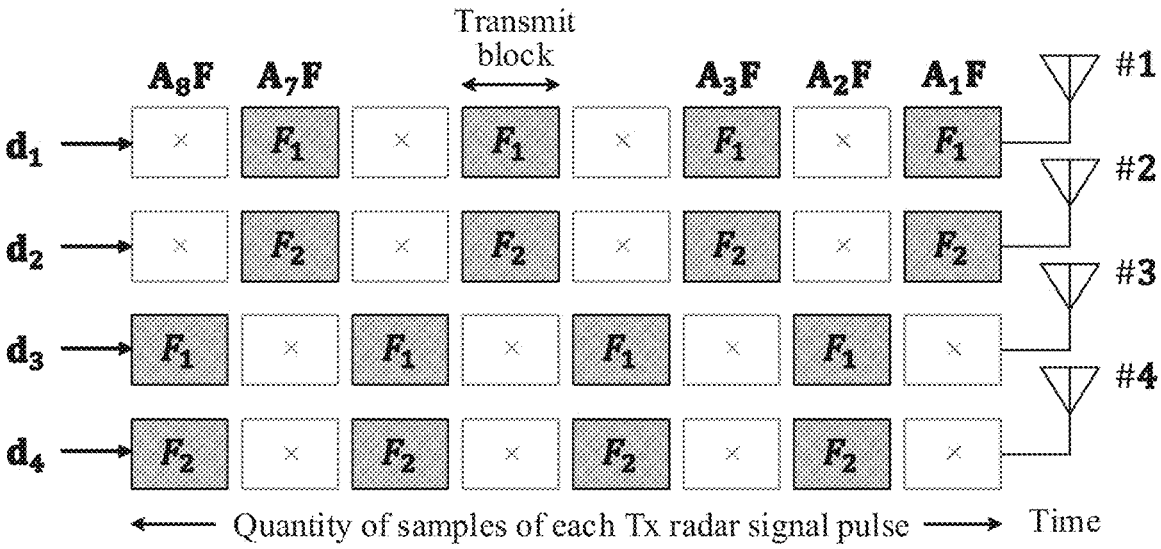
FIG. 11 is a schematic diagram of TDM-FDM-based orthogonal MIMO-OFDM radar data signals according to an embodiment of this application.

When TDM-FDM-based orthogonal MIMO-OFDM radar data signals are considered, an OFDM transmit block corresponds to K' antennas. As shown in FIG. 11, a quantity K of antenna ports equals 4, a quantity N of samples of a transmitted MIMO-OFDM radar data signal pulse equals 8, and $K'=2$.

Specifically, a first MIMO-OFDM radar transmit block corresponds to transmit antennas 1 and 2, while a second MIMO-OFDM radar transmit block corresponds to transmit antennas 3 and 4. Subbands are $F_1$ and $F_2$ respectively, and a width of the subband is F/K'. More specifically, in the first MIMO-OFDM radar transmit block, a subband $F_1$ is mapped to the transmit antenna 1, and a subband $F_2$ is mapped to the transmit antenna 2, while in the second MIMO-OFDM radar transmit block, a subband $F_1$ is mapped to the transmit antenna 3, and a subband $F_2$ is mapped to the transmit antenna 4. By analogy, a third MIMO-OFDM radar transmit block to an eighth MIMO-OFDM radar transmit block use the same method to correspond to transmit antennas.

Similarly, it may be seen from the embodiment that a quantity K' of MIMO layers equals 2, and all transmit antennas are orthogonal to each other in the time domain and a frequency domain. However, the PDCCH format in the related art can indicate only MIMO information of a same subband. To inform the data receive end of the signaling information related to the MIMO data, the PDCCH in the related art is required to be redesigned or modified.

Embodiment 2

For solution 2, a scene of a MIMO radar with co-located antennas and a scene of a MIMO radar with distributed antennas are described in detail through embodiment 2.

Figure 12:
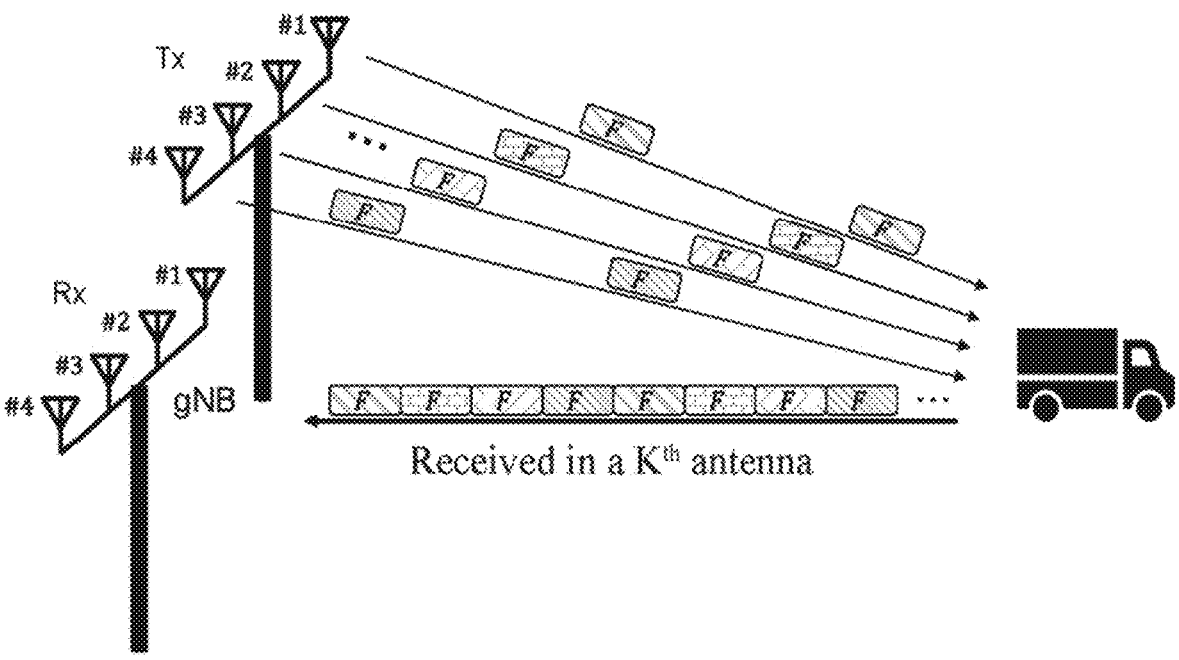
FIG. 12 is a schematic diagram of a scene of a MIMO radar with co-located antennas according to an embodiment of this application.

As shown in FIG. 12, the scene of the MIMO radar with co-located antennas is that a gNB is equipped with four transmit antennas, for sending downlink (DL) MIMO-OFDM radar data signals. At a same geographical location, the gNB has 4 receive antennas for receiving MIMO-OFDM radar reflected wave signals. The gNB is regarded as a TS entity herein.

Specifically, in a radar process of the gNB, the gNB first estimates an AoA for an object target, for example, relying on a conventional MUSIC algorithm to accurately estimate the AoA. A range and a Doppler frequency shift are then estimated for the object target by using receive beamforming based on the estimated AoA.

More specifically, the DL MIMO-OFDM radar data signal is sent from the gNB, and a receiving user end receives a MIMO-OFDM radar data signal by decoding a PDCCH and then decoding a PDSCH data signal based on a requirement. Herein, a data receiving user end is regarded as a CO entity.

More effectively, this MIMO-OFDM radar data signal scene may be achieved by using TDM-based orthogonal MIMO-OFDM radar data signals.

Figures 13, 14:
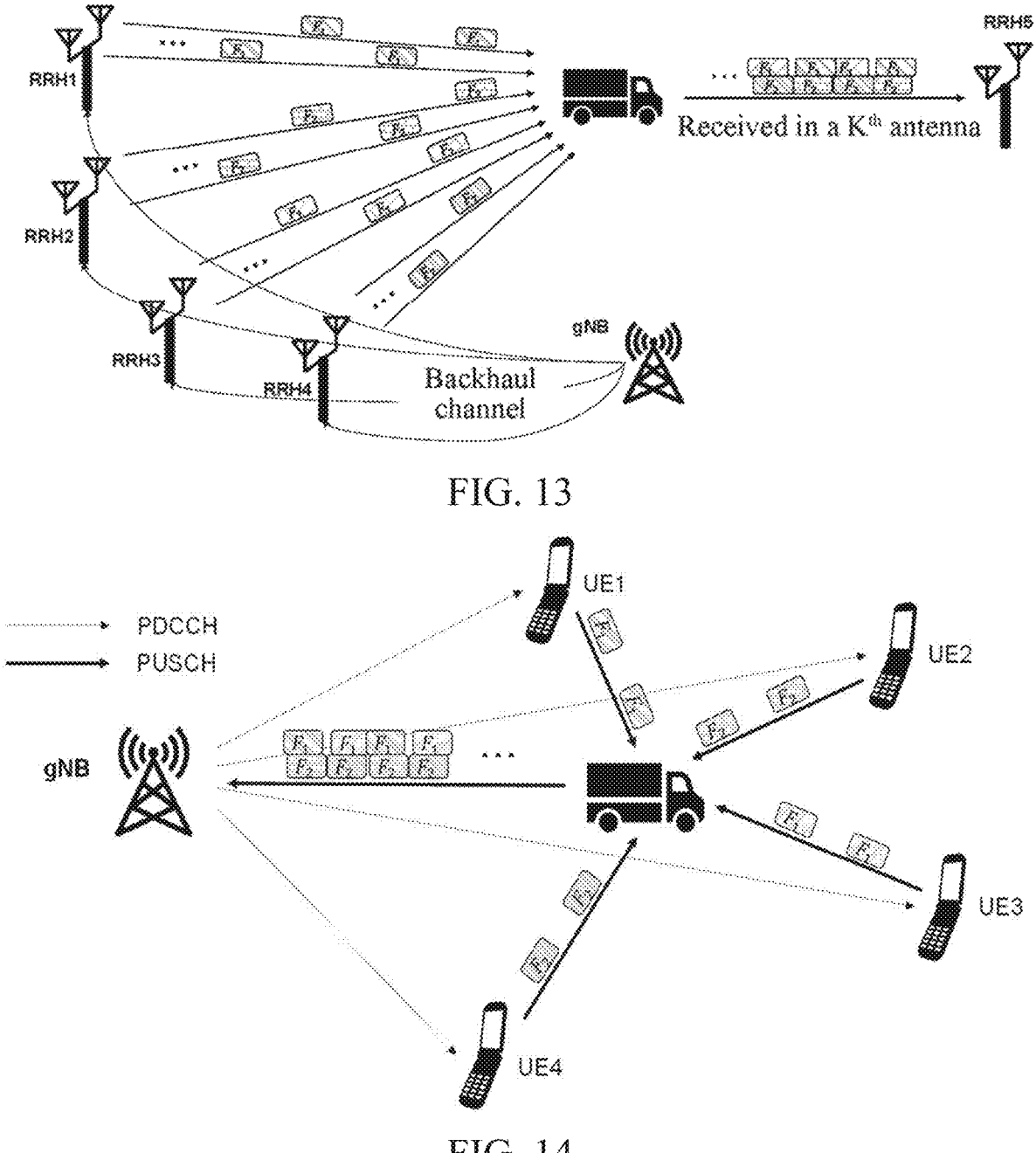
FIG. 13 is a schematic diagram of a scene of a DL-MIMO radar with distributed antennas according to an embodiment of this application.
FIG. 14 is a schematic diagram of a scene of a UL-MIMO radar with distributed antennas according to an embodiment of this application.

As shown in FIG. 13, a scene of a DL-MIMO radar with distributed antennas is that a gNB is connected to 4 remote radio heads (RRH), which are RRH1, RRH2, RRH3, and RRH4 respectively. Each RRH has two transmit antennas for sending DL MIMO-OFDM radar data signals. The gNB performs joint resource scheduling for the RRH1, the RRH2, the RRH3, and the RRH4 by using a MAC entity.

In addition, at a distributed geographical location, an RRH5 has two receive antennas for receiving MIMO-OFDM radar reflected wave signals. A receiving processing process of the RRH5 may be divided into two cases. A first case is that if the gNB informs the RRH5 of specific radar data through a backhaul channel, the RRH5 may first simply remove the radar data, then estimate an AoA, and then estimate a range and a Doppler frequency shift. A second case is that if the gNB does not inform the RRH5 of the specific radar data, the RRH5 must first decode data transmitted on each subband and perform data removal processing on a received signal based on a decoding result, then estimate the AoA, and finally estimate the range and a Doppler frequency shift.

More effectively, this MIMO-OFDM radar data signal scene may be achieved by using TDM-FDM orthogonal MIMO-OFDM radar data signals based on joint resource scheduling methods of the gNB for different RRHs.

It may be understood that, data sent by each RRH is independent of each other, so that the RRHs are equipped with different PDCCHs. Therefore, in this scene, a conventional PDCCH can implement indication for MIMO signaling without any modification on an NR standard protocol in the related art.

More specifically, the DL MIMO-OFDM radar data signals are sent from different RRHs, and are received by a data receiving user end by decoding a corresponding PDCCH and then decoding a PDSCH data signal based on a requirement. Herein, the data receiving user end may be regarded as a reflector of the radar wave, and is defined as a CO entity.

As shown in FIG. 14, a scene of a UL-MIMO radar with distributed antennas is that a gNB is connected to UE1, UE2, UE3, and UE4 through Uu links. Each UE has a transmit antenna for sending a UL MIMO-OFDM radar data signal. The gNB performs joint resource scheduling for the UE1, the UE2, the UE3, and the UE4 by using a MAC entity.

Specifically, the gNB sends a PDCCH to schedule PUSCH time domain and frequency domain resources of each UE. Each UE sends an OFDM data signal based on a scheduling grant. The gNB first decodes a UL data signal transmitted on each subband and performs data removal processing on a received signal based on a decoding result, then estimates an AoA of a reflector, and finally estimates a range and a Doppler frequency shift.

More effectively, this MIMO-OFDM radar data signal scene may be achieved by using TDM-FDM orthogonal radar data signals based on joint resource scheduling methods of the gNB for different UE.

It may be understood that, time alignment (TA) between different UE should be centrally indicated by the gNB to effectively adjust an arrival time of the UE during radar sensing and avoid a sensing error caused by non-synchronization.

Embodiment 3

For solution 3, downlink transmission and uplink transmission are described in detail through embodiment 3.

In downlink transmission, a gNB may send radar data by using TDM-based, FDM-based, or TDM-FDM-based orthogonal MIMO-OFDM radar data signals for different UE.

Figures 15, 16:
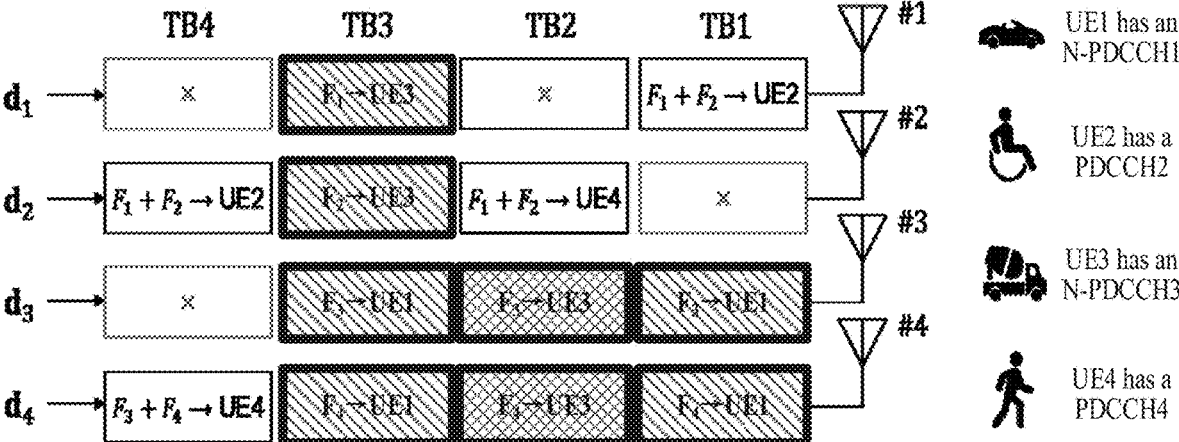
FIG. 15 is a schematic diagram of a scene of downlink transmission according to an embodiment of this application.
FIG. 16 is a first schematic diagram of a transmission apparatus according to an embodiment of this application.

As shown in FIG. 15, the gNB has four transmit antennas, required to send different data packets to four UE, namely, UE1, UE2, UE3, and UE4, at different times. The UE2 and UE4 belong to legacy UE in the related art, and can receive only a legacy PDCCH in the related art, in other words, the UE2 receives a PDCCH2, and the UE4 receives a PDCCH4. However, UE1 and UE3 belong to novel UE terminals, and can receive a newly designed N-PDCCH, in other words, the UE1 receives an N-PDCCH1, and the UE3 receives an N-PDCCH3. For convenience, the gNB always needs to occupy two subbands to send a data packet, that is, select two subbands among $F_1$, $F_2$, $F_3$ and $F_4$ to send the data packet.

It may be understood that, because the UE1 and the UE3 belong to the novel UE terminals and have backward compatibility, the UE1 and the UE3 can not only receive the newly designed N-PDCCH, but also receive the PDCCH in the related art.

It may be understood that, the PDCCH2 and the PDCCH4 can only indicate a mapping relationship between a subband and one antenna, while the N-PDCCH1 and the N-PDCCH3 can indicate mapping relationships between a subband and a plurality of antennas.

In a transmit block (TB) 1, the gNB maps the subbands $F_1$ and $F_2$ on a transmit antenna 1, and sends the PDCCH2 and a PDSCH (data packet) to the UE2; and simultaneously, the gNB respectively maps the subbands $F_3$ and $F_4$ on a transmit antenna 3 and a transmit antenna 4, and sends the PDSCH (data packet) and the N-PDCCH1 to the UE1.

In a TB2, the gNB maps the subbands $F_1$ and $F_2$ on a transmit antenna 2, and sends the PDCCH4 and the PDSCH (data packet) to the UE4; and simultaneously, the gNB respectively maps the subbands $F_3$ and $F_4$ on a transmit antenna 3 and a transmit antenna 4, and sends the PDSCH (data packet) and the N-PDCCH3 to the UE3.

In TB3, the gNB respectively maps the subbands $F_1$ and $F_2$ on the transmit antenna 1 and the transmit antenna 2, and sends the PDSCH (data packet) and the N-PDCCH3 to the UE3; and simultaneously, the gNB respectively maps the subbands $F_3$ and $F_4$ on the transmit antenna 3 and the transmit antenna 4, and sends the PDSCH (data packet) and the N-PDCCH1 to the UE1.

In a TB4, the gNB maps the subbands $F_1$ and $F_2$ on the transmit antenna 2, and sends the PDCCH2 and the PDSCH (data packet) to the UE2; and simultaneously, the gNB maps the subbands $F_3$ and $F_4$ on the transmit antenna 4, and sends the PDCCH4 and the PDSCH (data packet) to the UE4.

It may be understood that, the radar data transmission method for a plurality of users can improve spectrum utilization, while also effectively sensing an angle of departure (AoD), a range, and a Doppler frequency shift of an object target.

In uplink scheduling, likewise, the gNB may schedule relevant transmission resources of the TDM-based, FDM-based, or TDM-FDM-based orthogonal MIMO-OFDM radar data signals for different UE.

An implementation is basically the same as that of downlink transmission. The only difference is that the gNB sends a PDCCH for transmission resource scheduling for a plurality of users.

Embodiment 4

Solution 4 is described in detail through embodiment 4.

For DL MIMO-OFDM radar data signal, a PDCCH format 1_1 may be used for scheduling a PDSCH. The format 1_1 includes information about a quantity of antenna ports and a quantity of MIMO layers (4, 5, or 6 bits). For the quantity of antenna ports and the quantity of MIMO layers, reference may be made to Table 7.3.1.2.2-1/2/3/4 and Table 7.3.1.2.2-1A/2A/3A/4A in "3GPP TS 38.212 V16.5.0, Multiplexing and channel coding, 2021-03". Antenna ports $\{p_0, \ldots, p_v\}$ should be determined based on a port sequence of a demodulation reference signal (DMRS) provided in Table 7.3.1.2.2-1/2/3/4 or Table 7.3.1.2.2-1A/2A/3A/4A.

More effectively, a reserved DMRS port may be used. For example, in a DMRS downlink configuration (DMRS-DownlinkConfig), a DMRS type (dmrs-Type)=1, a maximum length (maxLength)=1, and a DMRS CDM group reserved value is 12 to 15. An advantage of the method is that there is no need to redesign a PDCCH-related format, and a format in the related art can be used as long as a reserved value in the format in the related art is redefined. For example, a DMRS CDM group reserved value 12 may be defined as a new MIMO-OFDM radar transmission waveform indication.

It may be understood that, a receive end user in the related art cannot interpret an indication meaning of the DMRS CDM group reserved value indication, which therefore means that MIMO-OFDM radar data cannot be decoded. However, for a data packet of a new receive end user, a gNB may redefine the DMRS CDM group reserved value and use a new MIMO-OFDM radar data signal transmission method to improve overall performance of radar data transmission.

It may be understood that, for a codeword, the DMRS CDM group reserved value is limited. But for two codewords, there is larger space for the DMRS CDM group reserved value. In other words, the larger space for the group reserved value, the more effective in redefining transmission of the DMRS CDM group reserved value for a new MIMO-OFDM radar data signal.

For UL MIMO-OFDM radar data signal, a PDCCH format 0_1 may be used for scheduling a PUSCH. The format 0_1 includes precoding information, a quantity of MIMO layers, precoding matrix indicators (PMI) (0, 2, 3, 4, 5, and 6 bits), and antenna ports (2, 3, 4, 5). A quantity of relevant bits of the precoding information and the quantity of MIMO layers is determined by a higher layer parameter "txConfi". A quantity of relevant bits of the antenna ports is determined by a quantity of CDM groups in Tables 7.3.1.1.2-6 to 7.3.1.1.2-23.

More effectively, a reserved DM-RS port may be used. For example, in a DMRS-UplinkConfig, dmrs-Type=1, maxLength=2, and a reserved value is 12 to 15. An advantage of the method is that there is no need to redesign the PDCCH-related format, and the format in the related art can be used as long as the reserved value in the format in the related art is redefined. For example, a DMRS CDM group reserved value 12 may be defined as a new MIMO-OFDM radar transmission waveform indication.

It may be understood that, a receive end user in the related art cannot interpret an indication meaning of the DMRS CDM group reserved value indication, which therefore means that MIMO-OFDM radar data cannot be decoded. However, for the data packet of the new receive end user, the gNB may redefine the DMRS CDM group reserved value and use a new MIMO-OFDM radar waveform transmission method to improve overall performance of radar data transmission.

More effectively, the gNB obtains a UE capability (namely, UE Capability) in advance, so that the gNB can effectively schedule MIMO-OFDM radar data signals for data packets sent by different UE. For example, when sending data for a UE (namely, a Legacy UE) in the related art, the gNB may use TDM-based orthogonal MIMO-OFDM radar data signals to send or schedule radar data for transmission, and when sending data for a novel UE, the gNB may use TDM-FDM-based orthogonal MIMO-OFDM radar data signals to send or schedule radar data for transmission through the foregoing unique PDCCH indication method. This flexible and effective scheduling method can optimize and improve overall performance of radar data transmission.

Refer to FIG. 16. An embodiment of this application provides a transmission apparatus, used in a first communication device. The apparatus 1600 includes:

a determining module 1601, configured to determine a MIMO-OFDM radar data signal based on first information; and a first sending module 1602, configured to send the MIMO-OFDM radar data signal to a second communication device through a transmit antenna, where MIMO-OFDM radar data signals of different transmit antennas are orthogonal; and the first information includes one or more of the following:

a MIMO precoding manner;

a signal multiplexing manner;

information about carrier aggregation; and capability information of the second communication device.

In an implementation of this application, when the first information includes the MIMO precoding manner, the determining module 1601 is further configured to precode a MIMO-OFDM data signal in one or more of a time domain, a frequency domain, and a spatial domain in the MIMO precoding manner, to obtain a MIMO-OFDM radar data signal of each transmit antenna.

In an implementation of this application, when the first information includes the signal multiplexing manner, the determining module 1601 is further configured to obtain a MIMO-OFDM radar data signal of each transmit antenna in the signal multiplexing manner, where the signal multiplexing manner includes one of the following:

a TDM;

an FDM;

the TDM and the FDM;

a CDM and the TDM;

the CDM and the FDM; and the CDM, the TDM, and the FDM.

In an implementation of this application, when the first information includes the information about the carrier aggregation, the determining module 1601 is further configured to map MIMO-OFDM radar data signals on different component carriers in the carrier aggregation to different transmit antennas based on the information about the carrier aggregation.

In an implementation of this application, the apparatus further includes:

a second sending module, configured to send first information to the second communication device, where the first information indicates to obtain FDM-based or TDM-FDM-based orthogonal MIMO-OFDM radar data signals by mapping signals on component carriers to corresponding transmit antennas, the first information is carried in DCI information, and the component carriers are orthogonal to each other.

In an implementation of this application, there are a plurality of pieces of first information, and the first information is in a one-to-one correspondence with the component carriers.

In an implementation of this application, the apparatus further includes:

a third sending module, configured to send second information to the second communication device in a component carrier scheduling manner, where the second information indicates information about FDM-based or TDM-FDM-based orthogonal MIMO-OFDM radar data signals, and the second information is carried in DCI information; and the scheduling manner includes at least one of a component carrier self-scheduling manner and a component carrier cross-scheduling manner.

In an implementation of this application, when the scheduling manner is the self-scheduling manner, a quantity of pieces of second information is the same as a quantity of component carriers; and when the scheduling manner is the cross-scheduling manner, a quantity of pieces of second information is a half of a quantity of component carriers.

In an implementation of this application, a format of the DCI information is a DCI format 0_2 or a DCI format 1_2, and a first field in the DCI format 0_2 or the DCI format 1_2 indicates one component carrier.

In an implementation of this application, the apparatus further includes:

a fourth sending module, configured to send third information to the second communication device, where the third information indicates information about TDM-based orthogonal MIMO-OFDM radar data signals, the TDM-based orthogonal MIMO-OFDM radar data signals simultaneously use a same transmit antenna and a same band resource, and the third information is carried in DCI information.

In an implementation of this application, the apparatus further includes:

a fifth sending module, configured to send fourth information to the second communication device, where the fourth information indicates information about FDM-based or TDM-FDM-based orthogonal MIMO-OFDM radar data signals, and the fourth information is carried in DCI information; and a format of the DCI information indicates a mapping relationship between a subband and a MIMO layer.

In an implementation of this application, the apparatus further includes:

a sixth sending module, configured to send fifth information to the second communication device based on the capability information of the second communication device, where the fifth information is carried in DCI information; and the fifth information indicates the first communication device to send radar data information by using FDM-based or TDM-FDM-based orthogonal MIMO-OFDM radar data signals, or the fifth information indicates the first communication device to send radar data information by using TDM-based orthogonal MIMO-OFDM radar data signals.

In an implementation of this application, the apparatus further includes:

a scheduling module, configured to schedule a transmission resource of TDM-based, FDM-based, or TDM-FDM-based orthogonal MIMO-OFDM radar data signals based on the capability information of the second communication device.

In an implementation of this application, the capability information of the second communication device indicates that the second communication device is a legacy terminal, or the second communication device is a novel terminal.

In an implementation of this application, the apparatus further includes:

a first receiving module, configured to receive OFDM data sent by different second communication devices; and a processing module, configured to decode the OFDM data, and sense a surrounding object target through distributed antennas of the different second communication devices.

In an implementation of this application, the scheduling module is further configured to: schedule one or more of a time domain resource, a frequency domain resource, and a spatial domain resource of the TDM-based orthogonal MIMO-OFDM radar data signals based on the capability information of the second communication device in the MIMO precoding manner, where the capability information of the second communication device indicates that the second communication device is a legacy terminal;

or schedule one or more of a time domain resource, a frequency domain resource, and a spatial domain resource of the FDM-based or TDM-FDM-based orthogonal MIMO-OFDM radar data signals based on the capability information of the second communication device in the MIMO precoding manner, where the capability information of the second communication device indicates that the second communication device is a novel terminal.

In an implementation of this application, when the transmit antenna has two antenna ports or four antenna ports, the precoding manner is a non-coherent precoding manner.

In an implementation of this application, the apparatus further includes:

a seventh sending module, configured to send sixth information to the second communication device, where the sixth information indicates information about FDM-based or TDM-FDM-based orthogonal MIMO-OFDM radar data signals, and the sixth information is carried in DCI information carried by a PDCCH.

In an implementation of this application, the FDM-based or TDM-FDM-based orthogonal MIMO-OFDM radar data signals correspond to rank-1 MIMO;

or the sixth information includes: one or more first indication bits, where each first indication bit corresponds to an antenna port of one transmit antenna;

or the sixth information includes: a second indication bit, where the second indication bit indicates that a sent signal is a MIMO-OFDM data signal or a MIMO-OFDM radar data signal, and a size of the second indication bit is one bit.

In an implementation of this application, when the second indication bit indicates that a sent signal is a MIMO-OFDM radar data signal, spectrum resource information of the sent MIMO-OFDM radar data signal and a quantity of antenna ports of the transmit antenna are used by the second communication device to determine a boundary location between subbands.

In an implementation of this application, channel estimation is independently performed in each subband.

In an implementation of this application, a quantity of bits of the sixth information is the same as a quantity of bits of information carried by a predefined PDCCH, and a format of the sixth information is different from a format of the information carried by the predefined PDCCH. The information carried by the predefined PDCCH is determined based on information carried by a PDCCH defined by the related art or a protocol.

In an implementation of this application, the DCI information carries one or more of the first information, the second information, the third information, the fourth information, the fifth information, and the sixth information.

The apparatus provided in this embodiment of this application can implement all processes implemented by the method embodiments shown in FIG. 5 and achieve the same technical effects. Details are not described herein again to avoid repetition.

Figure 17:
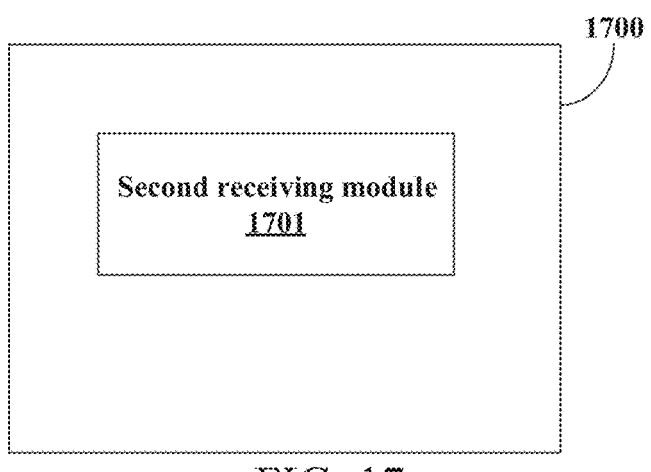
FIG. 17 is a second schematic diagram of a transmission apparatus according to an embodiment of this application.

Refer to FIG. 17. An embodiment of this application provides a transmission apparatus, used in a second communication device. The apparatus 1700 includes:

a second receiving module 1701, configured to receive, by the second communication device, a MIMO-OFDM radar data signal sent by a first communication device through a transmit antenna, where MIMO-OFDM radar data signals transmitted by different transmit antennas of the first communication device are orthogonal; and the MIMO-OFDM radar data signal is determined by the first communication device based on first information, and the first information includes one or more of the following:

a MIMO precoding manner;

a signal multiplexing manner;

information about carrier aggregation; and capability information of the second communication device.

In an implementation of this application, the signal multiplexing manner includes one of the following:

a TDM;

an FDM;

the TDM and the FDM;

a CDM and the TDM;

the CDM and the FDM; and the CDM, the TDM, and the FDM.

In an implementation of this application, the apparatus further includes:

a third receiving module, configured to receive the first information from the first communication device, where the first information indicates the first communication device to obtain FDM-based or TDM-FDM-based orthogonal MIMO-OFDM radar data signals by mapping signals on component carriers to corresponding transmit antennas, the first information is carried in DCI information, and the component carriers are orthogonal to each other.

In an implementation of this application, the apparatus further includes:

a fourth receiving module, configured to receive second information from the first communication device, where the second information is sent by the first communication device in a component carrier scheduling manner, the second information indicates information about FDM-based or TDM-FDM-based orthogonal MIMO-OFDM radar data signals, and the second information is carried in DCI information; and the scheduling manner includes at least one of a component carrier self-scheduling manner and a component carrier cross-scheduling manner.

In an implementation of this application, the apparatus further includes:

a fifth receiving module, configured to receive third information from the first communication device, where the third information indicates information about TDM-based orthogonal MIMO-OFDM radar data signals, the TDM-based orthogonal MIMO-OFDM radar data signals simultaneously use a same transmit antenna and a same band resource, and the third information is carried in DCI information.

In an implementation of this application, the apparatus further includes:

a sixth receiving module, configured to receive fourth information from the first communication device, where the fourth information indicates information about FDM-based or TDM-FDM-based orthogonal MIMO-OFDM radar data signals, and the fourth information is carried in DCI information; and a format of the DCI information indicates a mapping relationship between a subband and a MIMO layer.

In an implementation of this application, the apparatus further includes:

a seventh receiving module, configured to receive fifth information from the first communication device, where the fifth information is sent by the first communication device based on the capability information of the second communication device, and the fifth information is carried in DCI information; and the fifth information indicates the first communication device to send radar data information by using FDM-based or TDM-FDM-based orthogonal MIMO-OFDM radar data signals, or the fifth information indicates the first communication device to send radar data information by using TDM-based orthogonal MIMO-OFDM radar data signals.

In an implementation of this application, the apparatus further includes:

an eighth receiving module, configured to receive sixth information from the first communication device, where the sixth information indicates information about FDM-based or TDM-FDM-based orthogonal MIMO-OFDM radar data signals, and the sixth information is carried in DCI information; and In an implementation of this application, the FDM-based or TDM-FDM-based orthogonal MIMO-OFDM radar data signals correspond to rank-1 MIMO;

or the sixth information includes: one or more first indication bits, where each first indication bit corresponds to an antenna port of one transmit antenna;

or the sixth information includes: a second indication bit, where the second indication bit indicates that a sent signal is a MIMO-OFDM data signal or a MIMO-OFDM radar data signal; and a size of the second indication bit is one bit.

In an implementation of this application, when the second indication bit indicates that a sent signal is a MIMO-OFDM radar data signal, the apparatus further includes:

a processing module, configured to obtain spectrum resource information of the sent MIMO-OFDM radar data signal and a quantity of antenna ports of the transmit antenna by decoding a PDCCH; and the second communication device determines a boundary location between subbands based on the spectrum resource information of the sent MIMO-OFDM radar data signal and the quantity of antenna ports of the transmit antenna.

In an implementation of this application, the DCI information carries one or more of the first information, the second information, the third information, the fourth information, the fifth information, and the sixth information.

The apparatus provided in this embodiment of this application can implement all processes implemented by the method embodiments shown in FIG. 6 and achieve the same technical effects. Details are not described herein again to avoid repetition.

An embodiment of this application further provides a terminal, including a processor and a communication interface. The processor is configured to perform procedure of the method shown in FIG. 5 or FIG. 6. The terminal embodiment corresponds to the foregoing terminal side method embodiment, each implementation process and manner of the foregoing method embodiment is applicable to the terminal embodiment, and the same technical effects can be achieved.

Figure 18:
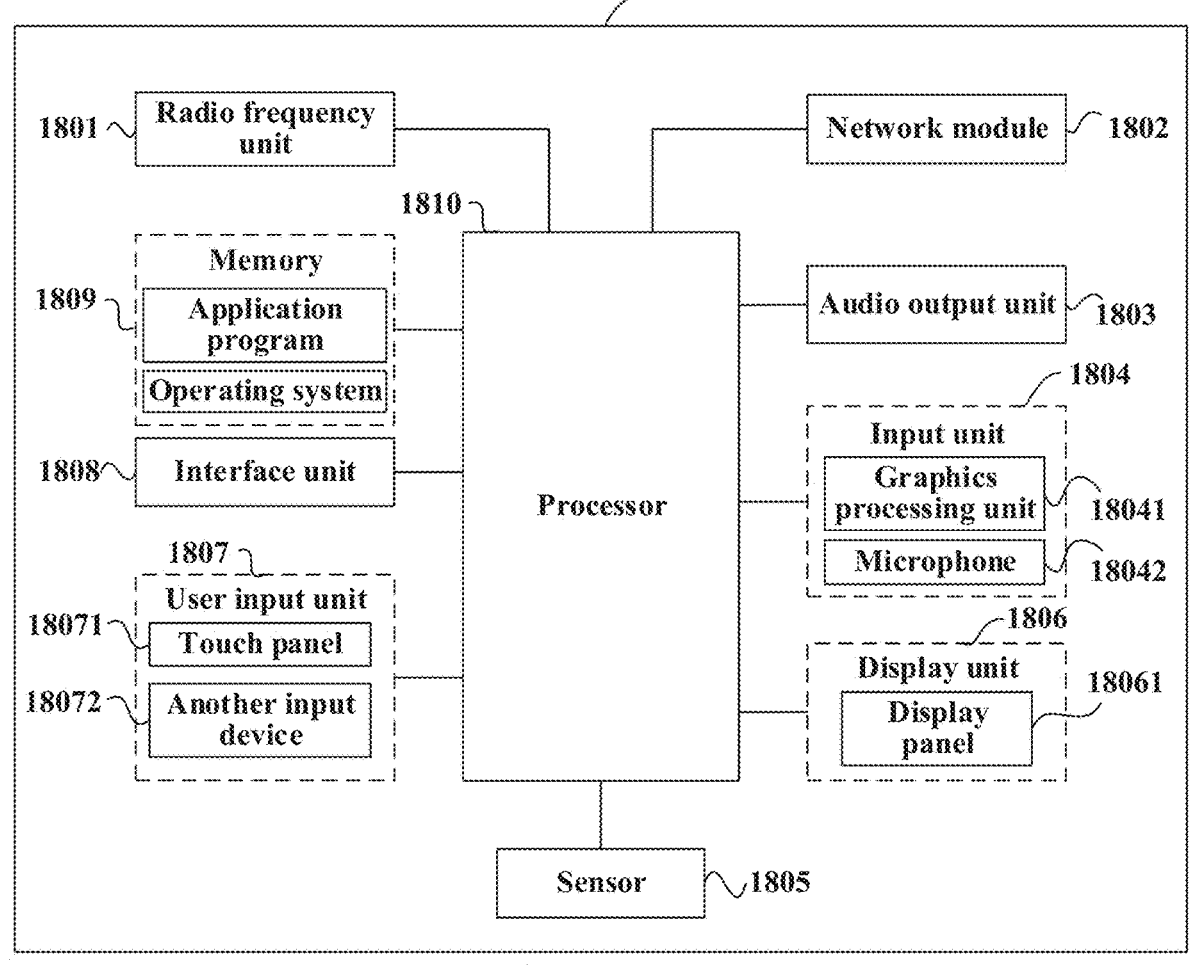
FIG. 18 is a schematic diagram of a terminal according to an embodiment of this application.

Specifically, FIG. 18 is a schematic diagram of a hardware structure of a terminal according to an embodiment of this application. A terminal 1800 includes, but is not limited to, at least parts of components such as a radio frequency unit 1801, a network module 1802, an audio output unit 1803, an input unit 1804, a sensor 1805, a display unit 1806, a user input unit 1807, an interface unit 1808, a memory 1809, and a processor 1810.

A person skilled in the art may understand that the terminal 1800 may further include a power supply (such as a battery) for supplying power to the components. The power supply may be logically connected to the processor 1810 by using a power management system, thereby implementing functions such as charging, discharging, and power consumption management by using the power management system. A terminal structure shown in FIG. 18 constitutes no limitation on the terminal, and the terminal may include more or fewer components than those shown in the figure, or some components may be combined, or a different component deployment may be used, which are not described herein again.

It is to be understood that, in this embodiment of this application, the input unit 1804 may include a graphics processing unit (GPU) 18041 and a microphone 18042, and the graphics processing unit 18041 processes static pictures or video image data obtained by an image capturing device (such as a camera) in a video capturing mode or an image capturing mode. The display unit 1806 may include a display panel 18061, and the display panel 18061 may be configured by using a liquid crystal display, an organic light-emitting diode, or the like. The user input unit 1807 includes a touch panel 18071 and another input device 18072. The touch panel 18071 is also referred to as a touch screen. The touch panel 18071 may include two parts: a touch detection apparatus and a touch controller. The another input device 18072 may include, but is not limited to, a physical keyboard, a functional key (such as a volume control key or a switch key), a track ball, a mouse, and a joystick, which are not described herein again.

In this embodiment of this application, the radio frequency unit 1801 receives downlink data from a network side device and transmits the downlink data to the processor 1810 for processing; and in addition, uplink data is sent to the network side device. Generally, the radio frequency unit 1801 includes, but is not limited to, an antenna, at least one amplifier, a transceiver, a coupler, a low noise amplifier, a duplexer, and the like.

The memory 1809 may be configured to store a software program or instructions and various data. The memory 1809 may mainly include a program or instruction storage area and a data storage area. The program or instruction storage area may store an operating system, an application program or instructions required by at least one function (for example, a sound playback function and an image display function), and the like. In addition, the memory 1809 may include a high speed random access memory, and may further include a non-transitory memory, where the non-transitory memory may be a read-only memory (ROM), a programmable read-only memory (PROM), an erasable programmable read-only memory (EPROM), an electrically erasable programmable read-only memory (EEPROM), or a flash memory. For example, at least one magnetic disk storage device, a flash memory device, or another non-transitory solid-state storage device.

The processor 1810 may include one or more processing units. Optionally, the processor 1810 may integrate an application processor and a modem processor, where the application processor mainly processes an operating system, a user interface, an application program or instructions, and the like, and the modem processor mainly processes wireless communication, for example, a baseband processor. It may be understood that the foregoing modem processor may also not be integrated into the processor 1810.

The terminal provided in this embodiment of this application can implement all processes implemented by the method embodiments shown in FIG. 5 or FIG. 6 and achieve the same technical effects. Details are not described herein again to avoid repetition.

Figure 19:
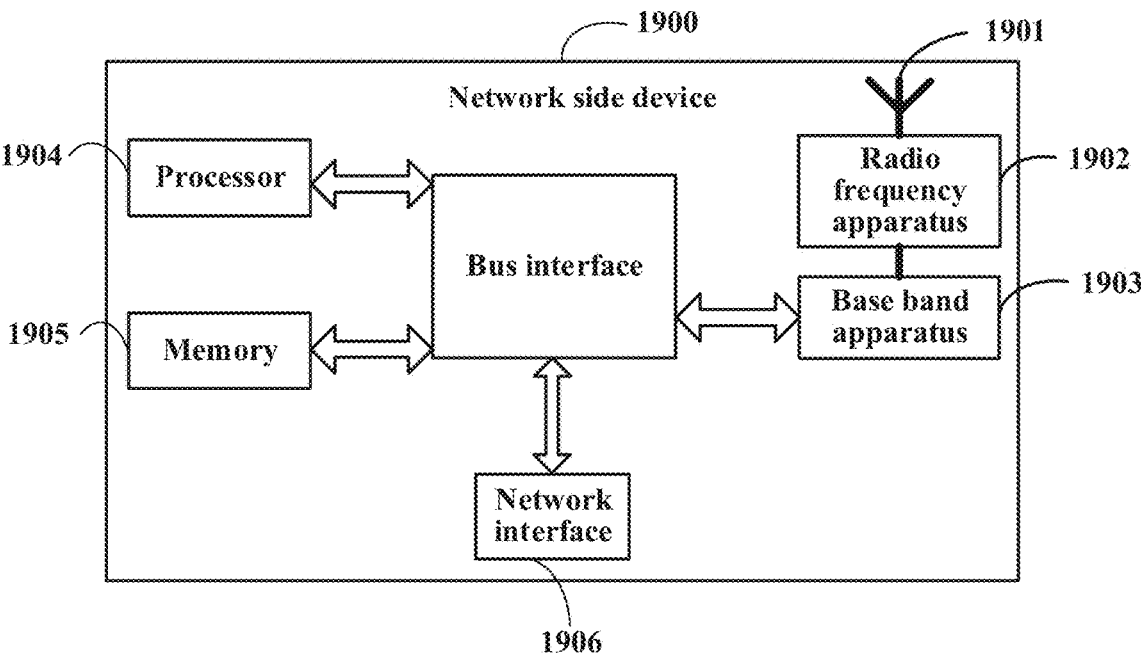
FIG. 19 is a schematic diagram of a network side device according to an embodiment of this application.

Specifically, an embodiment of this application further provides a network side device. As shown in FIG. 19, a network side device 1900 includes: an antenna 1901, a radio frequency apparatus 1902, and a baseband apparatus 1903. The antenna 1901 is connected to the radio frequency apparatus 1902. In an uplink direction, the radio frequency apparatus 1902 receives information through the antenna 1901 and sends the received information to the baseband apparatus 1903 for processing. In a downlink direction, the baseband apparatus 1903 processes the information to be sent and sends processed information to the radio frequency apparatus 1902. The radio frequency apparatus 1902 processes received information and sends processed received information out through the antenna 1901.

The foregoing radio frequency apparatus may be located in the baseband apparatus 1903, and the method executed by the network side device in the above embodiments may be implemented in the baseband apparatus 1903, where the baseband apparatus 1903 includes a processor 1904 and a memory 1905.

The baseband apparatus 1903 may, for example, include at least one baseband board, where a plurality of chips is disposed on the baseband board. As shown in FIG. 19, one of the chips is, for example, the processor 1904, connected with the memory 1905 to invoke a program in the memory 1905 to perform network device operations shown in the above method embodiments.

The baseband apparatus 1903 may further include a network interface 1906, configured to exchange information with the radio frequency apparatus 1902. The interface is, for example, a common public radio interface (CPRI).

Specifically, the network side device in this embodiment of this application further includes: instructions or a program stored in the memory 1905 and runnable on the processor 1904.

It may be understood that the processor 1904 invokes the instructions or the program in the memory 1905 to perform the method performed by the modules shown in FIG. 17 or FIG. 18, and achieves the same technical effects. Details are not described herein again to avoid repetition.

Figure 20:
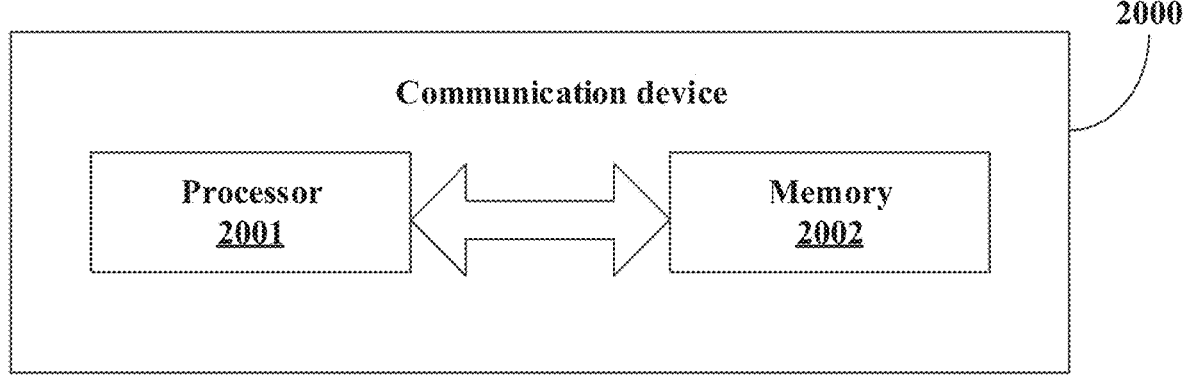
FIG. 20 is a schematic diagram of a communication device according to an embodiment of this application.

Optionally, as shown in FIG. 20, an embodiment of this application further provides a communication device 2000, including a processor 2001, a memory 2002, and a program or instructions stored in the memory 2002 and runnable on the processor 2001. For example, when the communication device 2000 is a terminal, when the program or the instructions are executed by the processor 2001, each process of the foregoing method embodiments shown in FIG. 5 or FIG. 6 is implemented, and the same technical effects can be achieved. When the communication device 2000 is a network side device, when the program or the instructions are executed by the processor 2001, each process of the foregoing method embodiments shown in FIG. 5 or FIG. 6 is implemented, and the same technical effects can be achieved. Details are not described herein again to avoid repetition.

An embodiment of this application further provides a computer program/program product. The computer program/program product is stored in a non-volatile storage medium, and the computer program/program product is executed by at least one processor to implement the steps of the processing method described in FIG. 5 or FIG. 6.

An embodiment of this application further provides a non-transitory readable storage medium, storing a program or instructions. When the program or the instructions are executed by a processor, each process of the foregoing method embodiments shown in FIG. 5 or FIG. 6 is implemented and the same technical effects can be achieved. Details are not described herein again to avoid repetition.

The processor is the processor in the terminal or the network side device described in the foregoing embodiment. The non-transitory readable storage medium may be non-transitory, or may be non-votatile. The non-transitory readable storage medium includes a non-transitory computer-readable storage medium, such as a read-only memory (ROM), a random access memory (RAM), a magnetic disk, or an optical disk.

An embodiment of this application further provides a chip, including a processor and a communication interface. The communication interface is coupled to the processor, the processor is configured to run a program or instructions to implement each process of the foregoing method embodiments shown in FIG. 5 or FIG. 6, and the same technical effects can be achieved. Details are not described herein again to avoid repetition.

It is to be understood that the chip mentioned in this embodiment of this application may also be referred to as a system-level chip, a system chip, a chip system, an SoC chip, or the like.

It is to be noted that, the foregoing embodiments may be implemented as a single embodiment, or may be implemented by mutual association or combination of a plurality of embodiments with each other, and the same or similar technical effects can be achieved, which is not limited in this application.

It is to be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the process, method, object, or apparatus. In addition, it is to be noted that, the scope of the method and apparatus in the embodiments of this application is not limited to performing the functions in the order shown or discussed, but may also include performing the functions in a substantially simultaneous manner or in a reverse order according to the functions involved, for example, the described method may be performed in a sequence different from the described order, and various steps may also be added, omitted, or combined. In addition, features described with reference to certain examples may be combined in other examples.

Through the description of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the related art may be implemented in a form of a computer software product. The computer software product is stored in a storage medium (such as a ROM/RAM, a magnetic disk, or an optical disk) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. A transmission method, comprising:
   determining, by a first communication device, multiple-input multiple-output-orthogonal frequency division multiplexing (MIMO-OFDM) radar data signals based on first information; and
   sending, by the first communication device, the MIMO-OFDM radar data signals to a second communication device through transmit antennas, wherein MIMO-OFDM radar data signals of different transmit antennas are orthogonal; and the first information comprises one or more of the following:

a MIMO precoding manner;

a signal multiplexing manner;

information about carrier aggregation; and capability information of the second communication device;

wherein after the step of determining, by the first communication device, the MIMO-OFDM radar data signals based on the first information, the method further comprises:

sending, by the first communication device, third information to the second communication device, wherein the third information indicates information about time division multiplexing based (TDM-based) orthogonal MIMO-OFDM radar data signals, and the third information is carried in downlink control information (DCI);

or, wherein after the step of determining, by the first communication device, the MIMO-OFDM radar data signals based on the first information, the method further comprises:

sending, by the first communication device, fourth information to the second communication device, wherein the fourth information indicates information about frequency division multiplexing based (FDM-based) or TDM-FDM-based orthogonal MIMO-OFDM radar data signals, and the fourth information is carried in DCI; and a format of the DCI indicates a mapping relationship between a subband and a MIMO layer;

or, wherein after the step of determining, by the first communication device, the MIMO-OFDM radar data signals based on the first information, the method further comprises:

sending, by the first communication device, fifth information to the second communication device based on the capability information of the second communication device, wherein the fifth information is carried in DCI; and the fifth information indicates the first communication device to send radar data information by using FDM-based or TDM-FDM-based orthogonal MIMO-OFDM radar data signals, or the fifth information indicates the first communication device to send the radar data information by using TDM-based orthogonal MIMO-OFDM radar data signals.

2. The method according to claim 1, wherein when the first information comprises the MIMO precoding manner, the step of determining, by the first communication device, the MIMO-OFDM radar data signals based on the first information comprises:

precoding, by the first communication device, a MIMO-OFDM data signal in one or more of a time domain, a frequency domain, and a spatial domain in the MIMO precoding manner, to obtain a MIMO-OFDM radar data signal of each transmit antenna;

or, wherein when the first information comprises the signal multiplexing manner, the step of determining, by the first communication device, the MIMO-OFDM radar data signals based on the first information comprises:

obtaining, by the first communication device, a MIMO-OFDM radar data signal of each transmit antenna in the signal multiplexing manner, wherein the signal multiplexing manner comprises one of the following:

a time division multiplexing (TDM) mode;

a frequency division multiplexing (FDM) mode;

the TDM and the FDM;

a code division multiplexing (CDM) mode and the TDM;

the CDM and the FDM; and the CDM, the TDM, and the FDM.

3. The method according to claim 1, wherein when the first information comprises the information about the carrier aggregation, the step of determining, by the first communication device, the MIMO-OFDM radar data signals based on the first information, and the method further comprises:

mapping, by the first communication device, MIMO-OFDM radar data signals on different component carriers in the carrier aggregation to different transmit antennas based on the information about the carrier aggregation, wherein the component carriers are orthogonal to each other.

4. The method according to claim 3, wherein after the step of determining, by the first communication device, the MIMO-OFDM radar data signals based on the first information, the method further comprises:

sending, by the first communication device, the first information to the second communication device, wherein the first information indicates to obtain FDM-based or TDM-FDM-based orthogonal MIMO-OFDM radar data signals by mapping the MIMO-OFDM radar data signals on the component carriers to corresponding transmit antennas, and the first information is carried in a downlink control information (DCI) information;

wherein there are a plurality of pieces of first information, and the first information is in a one-to-one correspondence with the component carriers.

5. The method according to claim 3, wherein after the step of determining, by the first communication device, the MIMO-OFDM radar data signals based on the first information, the method further comprises:

sending, by the first communication device, second information to the second communication device in a component carrier scheduling manner, wherein the second information indicates information about FDM-based or TDM-FDM-based orthogonal MIMO-OFDM radar data signals, and the second information is carried in DCI; and the component carrier scheduling manner comprises at least one of a component carrier self-scheduling manner and a component carrier cross-scheduling manner;

wherein when the component carrier scheduling manner is the component carrier self-scheduling manner, a quantity of pieces of the second information is the same as a quantity of the component carriers; and when the component carrier scheduling manner is the component carrier cross-scheduling manner, the quantity of pieces of the second information is a half of the quantity of the component carriers.

6. The method according to claim 1, wherein when the first information comprises the capability information of the second communication device, after the step of determining, by the first communication device, the MIMO-OFDM radar data signals based on the first information, the method further comprises:

scheduling, by the first communication device, a transmission resource of TDM-based, FDM-based, or TDM- FDM-based orthogonal MIMO-OFDM radar data signals based on the capability information of the second communication device.

7. The method according to claim 6, wherein the capability information of the second communication device indicates that the second communication device is a legacy terminal, or the second communication device is a novel terminal;

or, wherein when the first information comprises the capability information of the second communication device, after the step of determining, by the first communication device, the MIMO-OFDM radar data signals based on the first information, the method further comprises:

receiving, by the first communication device, OFDM data sent by different second communication devices; and decoding, by the first communication device, the OFDM data, and sensing a surrounding object target through distributed antennas of the different second communication devices;

or, wherein the step of scheduling, by the first communication device, the transmission resource of the TDM-based, the FDM-based, or the TDM-FDM-based orthogonal MIMO-OFDM radar data signals based on the capability information of the second communication device comprises:

scheduling, by the first communication device, one or more of a time domain resource, a frequency domain resource, and a spatial domain resource of the TDM-based orthogonal MIMO-OFDM radar data signals based on the capability information of the second communication device in the MIMO precoding manner, wherein the capability information of the second communication device indicates that the second communication device is a legacy terminal;

or, scheduling, by the first communication device, one or more of a time domain resource, a frequency domain resource, and a spatial domain resource of the FDM-based or the TDM-FDM-based orthogonal MIMO-OFDM radar data signals based on the capability information of the second communication device in the MIMO precoding manner, wherein the capability information of the second communication device indicates that the second communication device is a novel terminal.

8. The method according to claim 1, wherein when the first information comprises the capability information of the second communication device, after the step of determining, by the first communication device, the MIMO-OFDM radar data signals based on the first information, the method further comprises:

sending, by the first communication device, sixth information to the second communication device, wherein the sixth information indicates information about FDM-based or TDM-FDM-based orthogonal MIMO-OFDM radar data signals, and the sixth information is carried in DCI carried by a physical downlink control channel (PDCCH).

9. The method according to claim 8, wherein the FDM-based or TDM-FDM-based orthogonal MIMO-OFDM radar data signals correspond to rank-1 MIMO;

or the sixth information comprises: one or more first indication bits, wherein each first indication bit corresponds to an antenna port of one transmit antenna;

or the sixth information comprises: a second indication bit, wherein the second indication bit indicates that a sent signal is a MIMO-OFDM data signal or a MIMO-OFDM radar data signal, and a size of the second indication bit is one bit;

wherein when the second indication bit indicates that the sent signal is the MIMO-OFDM radar data signal, spectrum resource information of the sent MIMO-OFDM radar data signal and a quantity of antenna ports of the transmit antenna are used by the second communication device to determine a boundary location between subbands;

wherein channel estimation is independently performed in each subband.

10. The method according to claim 8, wherein a quantity of bits of the sixth information is the same as the quantity of bits of information carried by a predefined PDCCH, and a format of the sixth information is different from a format of the information carried by the predefined PDCCH;

or wherein the DCI carries one or more of the first information, a second information, the third information, the fourth information, the fifth information, and the sixth information.

11. A non-transitory readable storage medium, storing a program or instructions, wherein when the program or the instructions are executed by a processor, causes the processor to perform the steps of the method according to claim 1.

12. A chip, comprising a processor and a communication interface, wherein the communication interface is coupled to the processor, and the processor is configured to run a program or instructions to perform the steps of the method according to claim 1.

13. A computer program product, stored in a non-volatile storage medium, wherein the computer program product is executed by at least one processor to perform the steps of the method according to claim 1.

14. A transmission method, comprising:

receiving, by a second communication device, multiple-input multiple-output-orthogonal frequency division multiplexing (MIMO-OFDM) radar data signals sent by a first communication device through transmit antennas, wherein MIMO-OFDM radar data signals transmitted by different transmit antennas of the first communication device are orthogonal; and the MIMO-OFDM radar data signals are determined by the first communication device based on first information, and the first information comprises one or more of the following:

a MIMO precoding manner;

a signal multiplexing manner;

information about carrier aggregation; and capability information of the second communication device;

wherein before or after or in the step of receiving, by the second communication device, the MIMO-OFDM radar data signals sent by the first communication device through the transmit antennas, the method further comprises:

receiving, by the second communication device, third information from the first communication device, wherein the third information indicates information about time division multiplexing based (TDM-based)

orthogonal MIMO-OFDM radar data signals, and the third information is carried in downlink control information (DCI);

or, wherein before or after or in the step of receiving, by the second communication device, the MIMO-OFDM radar data signals sent by the first communication device through the transmit antennas, the method further comprises:

receiving, by the second communication device, fourth information from the first communication device, wherein the fourth information indicates information about frequency division multiplexing based (FDM-based) or TDM-FDM-based orthogonal MIMO-OFDM radar data signals, and the fourth information is carried in DCI; and a format of the DCI indicates a mapping relationship between a subband and a MIMO layer;

or, wherein before or after or in the step of receiving, by the second communication device, the MIMO-OFDM radar data signals sent by the first communication device through the transmit antennas, the method further comprises:

receiving, by the second communication device, fifth information from the first communication device, wherein the fifth information is sent by the first communication device based on the capability information of the second communication device, and the fifth information is carried in DCI; and the fifth information indicates the first communication device to send radar data information by using FDM-based or TDM-FDM-based orthogonal MIMO-OFDM radar data signals, or the fifth information indicates the first communication device to send the radar data information by using TDM-based orthogonal MIMO-OFDM radar data signals.

15. The method according to claim 14, wherein the signal multiplexing manner comprises one of the following:

a time division multiplexing (TDM) mode;

a frequency division multiplexing (FDM) mode;

the TDM and the FDM;

a code division multiplexing (CDM) mode and the TDM;

the CDM and the FDM; and the CDM, the TDM, and the FDM;

or, wherein before or after or in the step of receiving, by the second communication device, the MIMO-OFDM radar data signals sent by the first communication device through the transmit antennas, the method further comprises:

receiving, by the second communication device, the first information from the first communication device, wherein the first information indicates the first communication device to obtain FDM-based or TDM-FDM-based orthogonal MIMO-OFDM radar data signals by mapping signals on component carriers to corresponding transmit antennas, the first information is carried in a downlink control information (DCI), and the component carriers are orthogonal to each other;

or, wherein before or after or in the step of receiving, by the second communication device, the MIMO-OFDM radar data signals sent by the first communication device through the transmit antennas, the method further comprises:

receiving, by the second communication device, second information from the first communication device, wherein the second information is sent by the first communication device in a component carrier scheduling manner, the second information indicates information about FDM-based or TDM-FDM-based orthogonal MIMO-OFDM radar data signals, and the second information is carried in DCI; and the component carrier scheduling manner comprises at least one of a component carrier self-scheduling manner and a component carrier cross-scheduling manner.

16. The method according to claim 14, wherein before or after or in the step of receiving, by the second communication device, the MIMO-OFDM radar data signals sent by the first communication device through the transmit antennas, the method further comprises:

receiving, by the second communication device, sixth information from the first communication device, wherein the sixth information indicates information about FDM-based or TDM-FDM-based orthogonal MIMO-OFDM radar data signals, and the sixth information is carried in DCI.

17. The method according to claim 16, wherein the FDM-based or the TDM-FDM-based orthogonal MIMO-OFDM radar data signals correspond to rank-1 MIMO;

or the sixth information comprises: one or more first indication bits, wherein each first indication bit corresponds to an antenna port of one transmit antenna;

or the sixth information comprises: a second indication bit, wherein the second indication bit indicates that a sent signal is a MIMO-OFDM data signal or a MIMO-OFDM radar data signal, and a size of the second indication bit is one bit;

wherein when the second indication bit indicates that the sent signal is the MIMO-OFDM radar data signal, the method further comprises:

obtaining, by the second communication device, spectrum resource information of the sent MIMO-OFDM radar data signal and a quantity of antenna ports of the transmit antenna by decoding a physical downlink control channel (PDCCH); and determining, by the second communication device, a boundary location between subbands based on the spectrum resource information of the sent MIMO-OFDM radar data signal and the quantity of antenna ports of the transmit antenna.

18. The method according to claim 16, wherein the DCI carries one or more of the first information, a second information, the third information, the fourth information, the fifth information, and the sixth information.

19. A communication device, comprising: a processor, a memory, and a program stored in the memory and runnable on the processor, wherein the program, when executed by the processor, causes the communication device to perform:

determining, by a first communication device, multiple-input multiple-output-orthogonal frequency division multiplexing (MIMO-OFDM) radar data signals based on first information; and sending, by the first communication device, the MIMO-OFDM radar data signals to a second communication device through transmit antennas, wherein MIMO-OFDM radar data signals of different transmit antennas are orthogonal; and the first information comprises one or more of the following:

a MIMO precoding manner;

a signal multiplexing manner;

information about carrier aggregation; and capability information of the second communication device;

wherein after the step of determining, by the first communication device, the MIMO-OFDM radar data signals based on the first information, wherein the program, when executed by the processor, causes the communication device further to perform:

sending third information to the second communication device, wherein the third information indicates information about time division multiplexing based (TDM-based) orthogonal MIMO-OFDM radar data signals, and the third information is carried in downlink control information (DCI);

or, wherein after the step of determining, by the first communication device, the MIMO-OFDM radar data signals based on the first information, wherein the program, when executed by the processor, causes the communication device further to perform:

sending fourth information to the second communication device, wherein the fourth information indicates information about frequency division multiplexing based (FDM-based) or TDM-FDM-based orthogonal MIMO-OFDM radar data signals, and the fourth information is carried in DCI; and a format of the DCI indicates a mapping relationship between a subband and a MIMO layer;

or, wherein after the step of determining, by the first communication device, the MIMO-OFDM radar data signals based on the first information, wherein the program, when executed by the processor, causes the communication device further to perform:

sending fifth information to the second communication device based on the capability information of the second communication device, wherein the fifth information is carried in DCI; and the fifth information indicates the communication device to send radar data information by using FDM-based or TDM-FDM-based orthogonal MIMO-OFDM radar data signals, or the fifth information indicates the communication device to send the radar data information by using TDM-based orthogonal MIMO-OFDM radar data signals.

\* \* \* \* \*